United States Patent
Hellam et al.

(10) Patent No.: US 11,594,217 B2
(45) Date of Patent: *Feb. 28, 2023

(54) SYSTEM AND METHOD OF GENERATING EFFECTS DURING LIVE RECITATIONS OF STORIES

(71) Applicant: Disney Enterprises, Inc., Burbank, CA (US)

(72) Inventors: Taylor Hellam, Burbank, CA (US); Malcolm E. Murdock, Burbank, CA (US); Mohammad Poswal, Burbank, CA (US); Nicolas Peck, Sherman Oaks, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 408 days.

This patent is subject to a terminal disclaimer.

(21) Appl. No.: 16/904,550

(22) Filed: Jun. 17, 2020

(65) Prior Publication Data

US 2020/0321003 A1    Oct. 8, 2020

Related U.S. Application Data

(63) Continuation of application No. 16/009,069, filed on Jun. 14, 2018, now Pat. No. 10,726,838.

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/02* (2013.01); *G10L 15/1815* (2013.01);
(Continued)

(58) Field of Classification Search
CPC ....... G10L 13/00; G10L 13/027; G10L 13/08; G10L 13/033; G10L 13/043; G10L 13/10;
(Continued)

(56) References Cited

U.S. PATENT DOCUMENTS 6,175,821 B1    1/2001 Page
6,246,983 B1    6/2001 Zou
(Continued)

OTHER PUBLICATIONS

P. Sarkar and K. S. Rao, "Data-driven pause prediction for synthesis of storytelling style speech based on discourse modes," 2015 IEEE International Conference on Electronics, Computing and Communication Technologies (CONECCT), 2015, pp. 1-5) (Year: 2015).*
Novel Effect | Powering Voice Interactive Entertainment Storytime & Sound Effect App For Kids; [retrieved from the internet on Apr. 27, 2018] https://www.noveleffect.com/about-us (3 pages).

*Primary Examiner* — Edgar X Guerra-Erazo
(74) *Attorney, Agent, or Firm* — Esplin & Associates, PC

(57) ABSTRACT

One aspect of this disclosure relates to presentation of a first effect on one or more presentation devices during an oral recitation of a first story. The first effect is associated with a first trigger point, first content, and/or first story. The first trigger point being one or more specific syllables from a word and/or phrase in the first story. A first transmission point associated with the first effect can be determined based on a latency of a presentation device and user speaking profile. The first transmission point being one or more specific syllables from a word and/or phrase before the first trigger point in the first story. Control signals for instructions to present the first content at the first trigger point are transmitted to the presentation device when a user recites the first transmission point such that first content is presented at the first trigger point.

20 Claims, 11 Drawing Sheets

(51) Int. Cl.
*G10L 15/18* (2013.01)
*G10L 15/02* (2006.01)
*G06F 3/01* (2006.01)
*G10L 15/08* (2006.01)

(52) U.S. Cl.
CPC ........ *G06F 3/016* (2013.01); *G10L 2015/027* (2013.01); *G10L 2015/088* (2013.01); *G10L 2015/223* (2013.01)

(58) Field of Classification Search
CPC ..... G10L 13/06; G10L 15/26; G10L 13/0335; G10L 2015/025; G10L 15/1807; G10L 13/02; G10L 13/07; G10L 2013/083; G10L 13/086; G10L 2013/105; G06F 3/165; G06F 40/35; G06F 40/30
See application file for complete search history.

(56) References Cited

U.S. PATENT DOCUMENTS

| | | |
|---|---|---|
| 7,921,013 B1 | 4/2011 | Ostermann |
| 8,447,604 B1 | 5/2013 | Chang |
| 9,548,046 B1 * | 1/2017 | Boggiano ............... G10L 15/05 |
| 10,726,838 B2 | 7/2020 | Hellam |
| 11,081,108 B2 * | 8/2021 | Zhang ............... G06F 16/90332 |
| 11,302,318 B2 * | 4/2022 | Mitsui ................... H04M 3/568 |
| 11,373,634 B2 * | 6/2022 | Yoo ................... G06F 16/90332 |
| 2002/0128838 A1 | 9/2002 | Veprek |
| 2003/0159566 A1 | 8/2003 | Sater |
| 2004/0111271 A1 | 6/2004 | Tischer |
| 2008/0235024 A1 | 9/2008 | Goldberg |
| 2019/0385601 A1 | 12/2019 | Hellam |
| 2020/0152172 A1 * | 5/2020 | Yoo .......................... G10L 15/22 |
| 2020/0357406 A1 * | 11/2020 | York ......................... G06F 3/167 |

* cited by examiner

SYSTEM AND METHOD OF GENERATING EFFECTS DURING LIVE RECITATIONS OF STORIES

FIELD OF THE DISCLOSURE

The present disclosure relates to facilitating a presentation of story-related effects at points on one or more electronic devices in a synchronized manner with a live recitation of a story.

BACKGROUND

Including audio and/or visual effects in a story can make the story more engaging. The audio and/or visual effects can enhance a users experience with the story.

SUMMARY

One aspect of this disclosure relates to systems and methods for facilitating a presentation of story-related effects on one or more presentation devices during a recitation of a story. The story may include one or more words and/or phrases presented on a physical book, a computing device, and/or other devices. A first effect corresponding to a first story may be associated with a first trigger point and a first content. The first trigger point may be one or more specific syllables from a word and/or phrase in the first story at which the first content should be presented. Latencies of the presentation devices may be obtained. User profiles defining speech rates of the users may be obtained. A first transmission point may be determined based on the latencies and/or user profile. The first transmission point may specify when control signals for instructions for presenting the first effect may be transmitted to the presentation devices. The first transmission point may be one or more specific syllables from a word and/or phrase in the story that occurs before the first trigger point. Responsive to detection of the first transmission point (e.g., the one or more specific syllables from the word and/or phrase in the story), a first control signals for a first instruction for effectuating presentation of the first effect may be transmitted to the presentation devices. The presentation devices may be caused to effectuating presentation of the first effect at the first trigger point based on the first instruction.

In some implementations, a system configured to facilitate a presentation of story-related effects at points in a story may include one or more of one or more servers, one or more computing platforms, one or more external resources, one or more presentation devices, and/or other components. Users may access the system via the computing platforms and/or other devices. In some implementations, the server(s) may include one or more of electronic storages, one or more physical processors, and/or other components. In some implementations, the one or more physical processors may be configured by machine-readable instructions. Executing the machine-readable instructions may cause the one or more physical processors to facilitate the presentation of the story-related effects at points in the story. The machine-readable instructions may include one or more computer program components. The one or more computer program components may include one or more of a latency component, a profile component, art identification component, a determination component, a transmission component, a presentation component, and/or other components.

The electronic storages may be configured to store content presentation information, story information, and/or other information. The content presentation information may define effects associated with individual stories, trigger points, and content associated with the effects, and/or other information. A first effect may be associated with a first story, a first trigger point, a first content, and/or other information. The first effect may be presented by one or more presentation devices during an oral recitation and/or physical communication of the first story. The first trigger point may be one or more specific syllables from a word and/or phrase in the first story at which the first content should be presented. The story information may define word context associated with the one or more syllables specifying words and/or phrases in a story and/or other information. The word context may define a story and/or a point in time within the progress through the story.

The latency component may be configured to obtain latency information and/or other information. The latency information may convey device latency in the execution of the effects by the individual presentation devices. The latency component may be configured to determine the latency information and/or other information.

The profile component may be configured to obtain user information and/or other information. The user information may define speaking profiles of users and/or other information. The speaking profiles may convey speech rates of users and/or other information. A speech rate may indicate a rate at which a user utters and/or conveys words included in a story.

The identification component may be configured to obtain audio information and/or other information. The identification component may be configured to determine a story and/or progress through the story that may be recited and/or conveyed by the user. The identification component may be configured to determine the story and/or the progress through the story that may be recited and/or conveyed by the user based on the audio information, the story information, and/or other information. The audio information may define utterances by the user and/or other information. The utterances may include one or more syllables specifying a word and/or phrase.

The determination component may be configured to determine transmission information and/or other information. The determination component may be configured to determine transmission information based on the latency information, user information, and/or other information. The transmission information may define transmission points associated with the effects and/or other information. The transmission points may include a first transmission point associated with a first effect. The first transmission point may be one or more specific syllables from words and/or phrases in the stories that may occur before the first trigger point associated with the first effect. The first transmission point may specify when instructions for effectuation presentation of the first effect may be transmitted to the presentation devices.

The transmission component may be configured to determine whether the transmission points may have been uttered and/or conveyed by the user. The transmission component may be configured to determine whether the first transmission point may have been uttered and/or conveyed by the user based on the audio information and/or other information. The transmission component may be configured to obtain the audio information and/or other information. The audio information may define utterances from the user that may or may not include the one or more syllables specifying the words and/or phrases of the transmission points.

The presentation component may be configured to cause the individual presentation devices to effectuate presentation of the effects. The presentation component may be configured to transmit control signals for the instructions for effectuating presentation of the first effect to the individual presentation devices when the one or more specific syllables of the first transmission point may be uttered and/or conveyed by the user. The control signals for the instructions may cause the individual presentation devices to effectuate presentation of the first effect at the first trigger point.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description and are not intended as a definition of the limits of the invention. As used in the specification and in the claims, the singular form of "a," "an," and "the" include plural referents unless the context clearly dictates otherwise.

DETAILED DESCRIPTION

Figure 1:
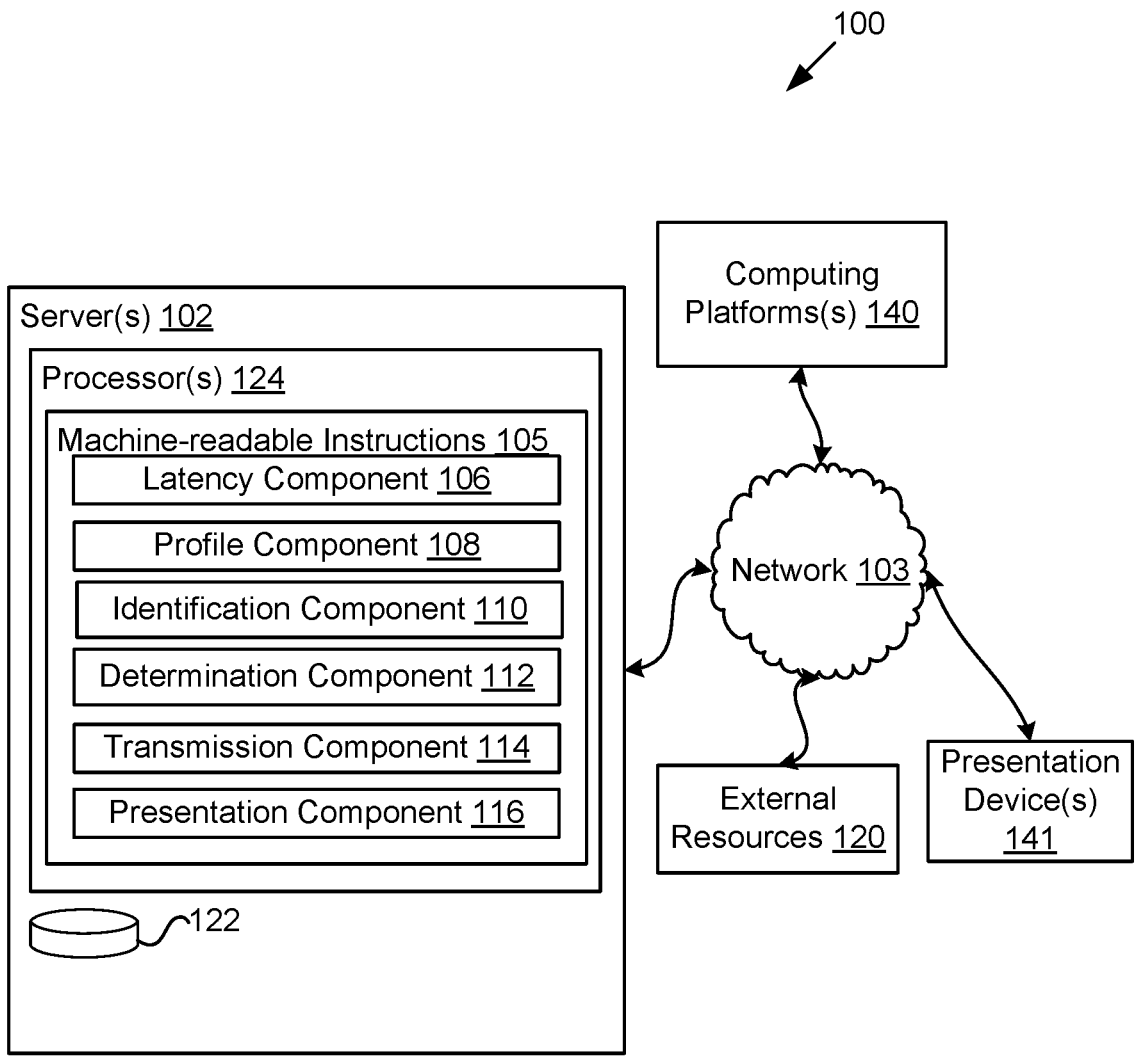
FIG. 1 illustrates a system for facilitating a presentation of story-related effects at points in a story, in accordance with one or more implementations.

FIG. 1 illustrates a system 100 configured to facilitate a presentation of story-related effects on one or more presentation devices during an oral recitation and/or physical communication of a story. The effects may be associated with trigger points in a story. The effects may be presented on the one or more presentation devices when a user recites and/or conveys the trigger points in the story associated with the effects. System 100 may be configured to transmit control signals for instructions to the one or more presentation devices such that the one or more presentation devices may present the effects when the user recites and/or conveys the trigger points in the story associated with the effects. System 100 may be configured to determine when to transmit the control signals for the instructions to the one or more presentation devices such that the one or more presentation devices present the effects when the user recites and/or conveys the trigger points in the story associated with the effects.

In some implementations, system 100 configured to facilitate a presentation of story-related effects at points in a story may include one or more of one or more servers 102, one or more computing platforms 140, one or more external resources 120, one or more presentation devices 141, and/or other components. Users may access system 100 via computing platform(s) 140 and/or other devices. In some implementations, server(s) 102 may include one or more of electronic storages 122, one or more physical processors 124, and/or other components. In some implementations, one or more physical processors 124 may be configured by machine-readable instructions 105. Executing machine-readable instructions 105 may cause one or more physical processors 124 to facilitate the presentation of the story-related effects at points in the story. Machine-readable instructions 105 may include one or more computer program components. The one or more computer program components may include one or more of a latency component 106, a profile component 108, an identification component 110, a determination component 112, a transmission component 114, a presentation component 116, and/or other components.

Computing platform(s) 140 may be one or more of a mobile computing device, a personal computer, a network of computers, a wearable computing device, a game console, and/or other computing platforms. For example, the mobile computing device may be one or more of a smartphone, smartwatch, smart home devices, and/or other devices. A wearable computing device may be a head-mounted computing device, headsets, headphones, and/or other devices. Computing platform(s) 140 may include one or more of one or more input devices, one or more displays, one or more sensors, one or more audio output devices, and/or other components. It is noted that computing platform(s) 140 may represent an individual computing platform and/or more than one computing platform that may be similarly configured as described herein.

The input devices of computing platform(s) 140 may include one or more of a computer mouse, a keyboard, a game controller, a touch-enabled input device, sensors, and/or other input devices. The input devices may be removably coupled to computing platform(s) 140. The input devices may be integrated with computing platform(s) 140.

The touch-enabled input device may be a touch screen and/or other devices. The touch screen may include one or more of a resistive touchscreen, a capacitive touchscreen, a surface acoustic wave touchscreen, an infrared touchscreen, an optical imaging touchscreen, an acoustic pulse recognition touchscreen, and/or other touchscreens. The touch-enabled input device may be configured to generate output signals conveying touch gesture information defining touch gesture inputs of the user.

The input devices of computing platform(s) 140 may be configured to obtain user input and/or other information. The user input may specify instructions for system 100. The user input may include one or more of a body gesture input, touch gesture input, controller input, text input, audio input, movement input, and/or other inputs.

The body gesture input may include information defining movement of a body part of the user, including movement of a hand, arm, leg, lip, and/or other body parts of the user. The body gesture input may convey one or more words and/or phrases in a story. The body gesture input may define a user's interaction with computing platform(s) 140. In some implementations, the body gesture input may convey a sign language. The sign language may convey one or more words and/or phrases in a story. In some implementations, the body gesture input may include movements of a lip of the user. The movements of the lip of the user convey one or more words and/or phrases in a story. In some implementations, the body gesture input may be obtained for visuals of the user. In some implementations, the body gesture input may be physical communication from the user.

The touch gesture input may include information defining one or more movements. The movements may include one or more of a finger press, a finger tap, a finger swipe, a finger flick, a finger drag, a pinch, a touch-and-hold, a scroll, and/or other finger movements. These movements may similarly be carried out using a tool, such as a stylus.

The controller input may include information defining one or more of a key/button pressing input, a key/button tapping input, a swiping input, a flick input, a drag input, a key/button press-and-hold input, a scroll input, and/or other inputs from a controller. The controller input may include one or more of a movement of a mouse, a movement of a mouse while holding a button on the mouse, a press of one or more keys of a keyboard, a movement of a joystick, a movement of a joystick while holding of a button on a controller, and/or other controller inputs.

In some implementations, the text input may be obtained from a keyboard, a voice recognition device, and/or other devices. The text input may include one or more words in one or more languages. The one or more words may be from one or more sentences in one or more languages.

The audio input may include audio information defining audio signals of the user. The audio signal of the user may be captured by a microphone and/or other audio capture devices. The audio signals from the user may be a voice command. In some implementations, instructions may be associated with the voice commands.

The movement input may include information defining movements of computing platform(s) 140 and/or other devices. The movements may include a shaking movement, a projection movement, a rotation movement, and/or other movements. The shaking movement may include the user shaking computing platform(s) 140 and/or other devices.

The displays may be a device configured to effectuate presentation of visual content. The displays include one or more of a touch-enabled display (e.g., the touchscreen), an LCD display, a LED display, an OLED display, a projector, and/or other displays. In some implementations, the display may be a video projector and/or other devices.

The sensors of computing platform(s) 140 may include one or more image sensors, audio sensors, and/or other sensors. The audio output devices for computing platform(s) 140 may be one or more of a speaker, a headphone, an earbud, and/or other audio output devices.

In some implementations, an image sensor may be configured to generate output signals conveying visual information and/or other information. The visual information may define visuals within a field of view of the image sensor and/or other content. The visuals may include depictions of real-world objects and/or surfaces. The visuals may be in the form of one or more of images, videos, and/or other visual information. The field of view of the image sensor may be a function of a position and an orientation of a computing platform. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other devices. In some implementations, the visual information may define the visuals of the user.

In some implementations, an audio sensor may be configured to generate output signals conveying audio information and/or other information. The audio information may define audio from the user of the audio sensor (e.g., utterances of the user), audio around the user (such as ambient audio), and/or other information. In some implementations, an audio sensor may include one or more of a microphone, a micro-electro-mechanical microphone, and/or other devices.

Presentation device(s) 141 may be configured to effectuate presentation of content and/or other information. The content may include one or more of audio content, visual content, motion content, environmental content, and/or other content. Presentation device(s) 141 may be one or more internet of things (IoT) devices and/or other devices. Presentation device(s) 141 may include one or more of smart devices, computing devices, and/or other devices. For example, the smart devices may be one or more of a smart speaker, smart fridge, smart televisions, a smart thermostat, smart lighting system, smart lock, smart doorbell, smart fan, and/or other smart devices. The computing devices may be the mobile computing device, the wearable computing device, the game console, and/or other devices. In some implementations, presentation device(s) 141 may be a connected vehicle and/or other devices. In some implementations, presentation device(s) 141 may be computing platform(s) 140 and/or other devices.

The audio content may include one or more of a soundtrack, music, sound effects, and/or utterances. In some implementations, the audio content may be presented by an audio output device of presentation device(s) 141. For example, the audio content may be presented by speakers of presentation device(s) 141. In some implementations, the audio content may be presented by performing one or more operations on presentation device(s) 141. For example, presentation device(s) 141 may generate engine noises by starting an ignition on a car, generate ice cube tray cracking noises by flipping an ice try of a smart fridge, generate doorbell sounds by ringing a smart doorbell, generate wind noises by starting a ventilation system, generate machinery noises by opening or closing a garage door, and/or generate other noises by operating presentation device(s) 141.

The visual content may include one or more of images and/or video. For example, the visual content may be the presentation of the one or more images and/or video. The images and/or video may be related to the story and/or a theme. In some implementations, the visual content may include manipulation of one or more a lighting device and/or other devices. Manipulation of one or more a lighting device may include manipulating an intensity, frequency, color, pattern, and/or other features of the light of the lighting device.

The lighting devices may include lighting devices in a building, a public area, a vehicle, the computing device, and/or other systems. The building may be one or more of a house, an office, a warehouse, and/or other buildings. The public area may be one or more of a stage (such as a concert stage), parks, streets, and/or other public areas. The vehicle may be one or more of a car, a bus, a train, an airplane, a vessel (such as a ship), a roller-coaster ride, an amusement park ride, and/or other vehicles.

Lighting devices in the building and/or the public area may include light fixtures of the building and/or the public area and/or other lighting systems. The lighting devices in the vehicle may include one or more external lighting fixtures, internal lighting fixtures, and/or other lighting systems. For example, the lighting devices in a car may include one or more of a headlight system, cabin light system, ambient light system, and/or other lighting systems.

The motion content may include one or more of haptic feedback and/or movement. The haptic feedback may include movement or vibrations of presentation device(s) 141. The movement may include a movement of one or more components of presentation device(s) 141. For example, the movement may be the operation of a garage door, the movement of the smart fan, and/or other movements.

The environmental content may include one or more of a change in the user's environmental condition. The user's environmental condition may include a change in temperature, ventilation, and/or other environmental conditions. The change in the user's environmental condition may include increasing or decreasing ambient temperature, increasing or decreasing ventilation, and/or other changes in the user's environmental condition. The increasing or decreasing an ambient temperature may be accomplished by increasing or decreasing temperatures settings of a heating, ventilation, and/or air conditioning system via presentation device(s) 141.

Electronic storages 122 may be configured to store content presentation information, story information, and/or other information. The content presentation information may define the effects and/or other information. The content presentation information may define the effects associated with the individual stories, the trigger points, the content, and/or other information. The content presentation information may define the association between the effects and the individual stories, the trigger points, the content, and/or other information. The effects may be presented by presentation device(s) 141 and/or other devices. The effects that may be presented by presentation device(s) 140 when the one or more stories may be conveyed by the user. For example, the one or more stories conveyed by the user may include physical communication, oral recitation, and/or other methods of conveying the one or more stories. The effects may be presented by presentation device(s) 140 during the oral recitation and/or physical communication of the one or more stories. The one or more stories may be presented on one or more of a physical book, computer platform(s) 140, and/or other devices. The physical book may include one or more physical pages. The one or more physical pages may include one or more words and/or phrase of the one or more stories. In some implementations, information defining the one or more words and/or phrases of the individual stories on the physical book, computer platform(s) 140 and/or other devices may be stored on electronic storages 122. In some implementations, the content presentation information may define the effects associated with individual stories on the physical book, computer platform(s) 140 and/or other devices.

In some implementations, the oral recitation of one or more stories may include oral recitation of the one or more stories on the physical book, computer platform(s) 140 and/or other devices. For example, the one or more stories may be presented on the physical book, computer platform(s) 140 and/or other devices. In some implementations, the oral recitation of the one or more stories may include oral recitation the one or more stories from the user's memory. The one or more stories from the user's memory may include one or more words and/or phrases that are similar and/or the same as the one or more stories on the physical book, computer platform(s) 140 and/or other devices.

In some implementations, the physical communication (such as sign language) of one or more stories may include the physical communication of the one or more stories on the physical book, computer platform(s) 140 and/or other devices. In some implementations, the physical communication of one or more stories may include the physical communication of the one or more stories from the user's memory.

A first set of effects may be associated with a first story and/or other stories. The first set of effects may include a first effect, a second effect, and/or other effects. The first effect may be associated with the first story, a first trigger point, a first content, and/or other information. The first effect may be presented by presentation device(s) 141 during an oral recitation and/or the physical communication of the first story. The first trigger point may be one or more specific syllables from a word and/or phrase in the first story at which the first content should be presented. The first content may be content with an association with a context of the word and/or phrase of the first trigger point in the first story. In other words, the first content presented on presentation device(s) 141 may be related to the context of the word and/or phrase of the first trigger point in the first story. By way of a non-limiting example, if the word and/or phrase of the first trigger point in the first story may be a word "roar," the first content may be audio of a roar, and/or if the first trigger point in the first story may be a word "explode," the first content may be audio of an explosion The second effect may be associated with the first story, a second trigger point, a second content, and/or other information. The second effect may be presented by presentation device(s) 141 during the oral recitation and/or the physical communication of the first story. The second trigger point may be one or more specific syllables from a word and/or phrase in the first story at which the second content should be presented. The first effect and the second effect may be different effects. The first trigger point and the second trigger point may be different trigger points. For example, the one or more specific syllables from the words and/or phrases of the first trigger point and the second trigger point may be different syllables from different words and/or phrases in the first story. The first content and the second content may be different content. The first content and the second content may be presented on the same presentation device(s) 141 and/or different presentation device(s) 141.

In some implementations, effects that may be presented by presentation device(s) 140 during physical communication of one or more stories. The physical communication may include the movement of the body part of the user. The physical communication may be communicated via sign languages and/or other physical communication methods. The sign languages include one or more hand gestures, movement, orientation of the fingers, arms or body, and facial expressions that may convey the user's ideas. The one or more hand gestures, movement, orientation of the fingers, arms or body, and facial expressions may convey the words and/or phrases in the one or more stories. The physical communication may convey the words and/or phrases in the one or more stories. The first trigger point may be the word and/or phrase in the first stories at with the first content should be presented.

The story information may define the one or more stories and/or other information. The story information may define one or more words and/or phrases in the story. The story information may define word context of words and/or phrases in the story and/or other information. The story information may define the word context associated with the one or more syllables specifying words and/or phrases in the story and/or other information. The word context may indicate the story and/or a point in time within the progress through the story. The word context may indicate the story that may be recited and/or conveyed by the user and/or a point in time within the progress through the story that may be recited and/or conveyed by the user. The word context may be used to determine the story that may be recited and/or conveyed by the user to determine the effects associated with the story. The word context may be used to determine the point in time within the progress through the story that may be recited by the user to determine the effects associated with the story. The user uttering and/or the manual communicating one or more words and/or phrases may include words and/or phrases with word context. An identification of the words and/or phrases with word context uttered and/or the manual communicated by the user may be used to determine the story that may be recited by the user and/or a point in time within the progress through the story that may be recited and/or conveyed (via manual communicated) by the user.

Latency component 106 may be configured to obtain latency information and/or other information. The latency information may define device latency of presentation device(s) 141 and/or other devices. The latency information may convey device latency in the execution of the effects by presentation device(s) 141. The device latency may convey a time between when information defining an instruction may be generated and executed by presentation device(s) 141. In some implementations, the device latency may convey a time between when the information defining the instruction may be transmitted and executed by presentation device(s) 141. The instruction may be generated and/or transmitted by components of server(s) 102 and/or computing platform(s) 140.

In some implementations, the latency information may define an application latency and/or other information. The application latency may specify a time between when user inputs may be received and when instructions based on the user inputs may be generated. For example, the application latency may specify when the user utters and/or conveys words and/or phrases and when instructions based on the utterances and/or conveyed words and/or phrases may be generated.

The latency information, including the device latency and/or the application latency, may be used to determine when the control signals for the instruction may be transmitted to presentation device(s) 141 such that presentation device(s) 141 may execute the instruction as the desired time. For example, latency information may be used to determine when the control signals for the instruction may be transmitted to presentation device(s) 141 such that presentation device(s) 141 may effectuate presentation of the first content at the first trigger point.

Latency component 106 may be configured to obtain the latency information from one or more of external resources 120, electronic storages 122, and/or other devices. In some implementations, the device latency of presentation device(s) 141 may be known and/or well recorded. For example, presentation device(s) 141 may include device latencies that may be specified by a manufacturer of presentation device(s) 141. The information defining the device latencies that may be specified by a manufacturer of presentation device(s) 141 may be stored in electronic storages 122 and/or other storage locations. The device latencies may be determined and/or recorded by the user.

In some implementations, latency component 106 may be configured to determine the latency information and/or other information. Latency component 106 may be configured to determine the device latency of presentation device(s) 141 and/or other information. Latency component 106 may be configured to determine the application latency and/or other information. Latency component 106 may be configured to store the latency information in electronic storage 120 and/or other storage locations.

Latency component 106 may monitor the device latency and application latency while the user may be uttering and/or conveying the one or more syllables specifying the one or more words and/or phrases of the story. Latency component 106 may determine and/or update the device latency and application latency while the user is uttering and/or conveying one or more syllables specifying the one or more words and/or phrases of the story. Latency component 106 may determine and/or update the device latency and application latency when a change in the device latency and application latency reaches a predetermined threshold. The predetermined threshold may be determined by the user and/or a designer.

Latency component 106 may be configured to determine the device latency of presentation device(s) 141 by transmitting signals (and/or pinging) to presentation device(s) 141 and determining when presentation device(s) 141 receives the signals. Latency component 106 may be configured to determine the device latency of presentation device(s) 141 by transmitting information defining instructions for presentation device(s) 141 and determining when presentation device(s) 141 executes the instructions. Latency component 106 may be configured to determine the device latency of presentation device(s) 141 by determining when generated instructions may be executed by presentation device(s) 141. Latency component 106 may determine a time the instructions may be generated, transmit the information defining the instructions, and determine when presentation device(s) 141 executes the instructions to determine when the generated instructions may be executed by presentation device(s) 141.

Latency component 106 may be configured to determine the application latency by determining a time between when the user input may be received and when instructions based on the user input may be generated. Latency component 106 may be configured to simulate the user input, generate information defining the instructions based on the simulated user input, and determine a time it took to generate the information defining the instructions to determine the application latency. Latency component 106 may be configured to obtain the user input, generate information defining the instructions based on the user input, and determine a time it took to generate the information defining the instructions to determine the application latency.

Profile component 108 may be configured to obtain user information and/or other information. The user information may define speaking profiles of users and/or other information. The user information may define the users and/or user account associated with the speaking profiles and/or user identification. Profile component 108 may be configured to obtain the user information from one or more of external resources 120, electronic storages 122, and/or other devices.

The speaking profiles may define a speech rate of the user and/or other information. The speech rate may indicate a rate at which the user utters and/or conveys words and/or phrases included in the story. The speech rate may indicate a rate at which the user utters syllables from words and/or phrases, conveys words and/or phrases, and/or other information. For example, the speech rate may indicate a number of syllables from words and/or phrases uttered by the user for a duration of time, and/or words and/or phrases conveyed for the duration of time.

In some implementations, the speaking profiles may define the user's literacy in one or more languages and/or other information. The user's literacy may include a reading proficiency, a reading pace and pacing (e.g., a speech rate), enunciation of words, and/or other information of the user's literacy. For example, the one or more language may be English, Spanish, Chinese, sign language, and/or other languages. The reading pace may specify a rate at which the user utters (e.g., reads) syllables from words and/or phrases and/or conveys words and/or phrases included in a story. For example, the reading pace may specify a number of words the user utters within a duration of time. The reading pacing may specify a change in the rate at which the user utters (e.g., reads) words and/or phrases included in the story. For example, the reading pacing may specify the rate at which the user utters (e.g., reads) syllables from words and/or phrases in different parts of the story. In some implementations, the reading pace may specify a rate at which the user conveys (e.g., via sign language) words and/or phrases included in the story. The rate at which the user conveys words and/or phrases included in the story may depend on the movement of the one or more hand gestures, movement, orientation of the fingers, arms or body, and facial expressions. For example, the reading pace may specify a number of words and/or phrases the user conveys within a duration of time. The reading pacing may specify a change in the rate at which the user convey words and/or phrases included in the story.

In some implementations, the speech rate may indicate a rate of physical communication and/or other information. In some implementations, the speech rate may indicate a rate at which the user moves their lips to specify one or more words and/or phrases. The speech rate may indicate a rate at which the user conveys (e.g., via sign language) words and/or phrases included in the story. The rate at which the user conveys words and/or phrases included in the story may depend on the movement of the one or more hand gestures, movement, orientation of the fingers, arms or body, and facial expressions.

Profile component 108 may be configured to determine the user information and/or other information. Profile component 108 may be configured to determine the user information based on the audio information, user identification, and/or other information. Profile component 108 may be configured to determine the speaking profiles of the users based on the audio information, user identification, and/or other information. Latency component 106 may be configured to store the user information in electronic storage 120 and/or other storage locations.

Profile component 108 may monitor the audio information and the speaking profiles of the users while the user may be uttering one or more syllables specifying the one or more words and/or phrases of the story. Profile component 108 may monitor the movements of the user's lips when the audio content of the audio information may be insufficient. For example, audio information may be insufficient when the words and/or phrases of the audio content cannot be identified. Profile component 108 may determine and/or update the speaking profiles of the users while the user may be uttering one or more syllables specifying the one or more words and/or phrases of the story. Profile component 108 may determine and/or update the speaking profiles of the users while the audio information of the user is uttering one or more syllables specifying the one or more words and/or phrases of the story is obtained. Profile component 108 may be configured to learn the user's speaking profile and update the user's speaking profile at or near real time.

Profile component 108 may monitor the physical communication of the user while the user may be conveying the one or more words and/or phrases of the story. Profile component 108 may determine and/or update the speaking profiles of the users while the user may be conveying the one or more words and/or phrases of the story. Profile component 108 may determine and/or update the speaking profiles of the users while the information defining the physical communication is obtained. Profile component 108 may be configured to learn the user's speaking profile and update the user's speaking profile at or near real-time based on the physical communication.

The audio information may define audio content from the user and/or other information. The audio content from the user may include utterances by the user and/or other information. The utterances may include one or more syllables specifying a word and/or phrase. The audio content from the user may include the user reading and/or speaking one or more words. Profile component 108 may be configured to use one or more natural language progressing techniques to identify and/or determine the one or more words and/or phrases specified by the one or more syllables uttered by the user. The user identification may define the user's age, gender, ethnicity, education, and/or other information of the users. Profile component 108 may be configured to obtain the audio information from computing platform(s) 140, presentation device(s) 141, and/or other devices. For example, the audio information may be obtained from a microphone of computing platform(s) 140 and/or other devices.

In some implementations, when the words and/or phrases of the audio content cannot be identified, visuals of movements of the lips of the user may be used to determine the words and/or phrases the user may be attempting to convey. The information defining the words and/or phrases the user converted by the movements of the lips of the user may be used in place and/or concurrently with the audio information.

Profile component 108 may be configured to determine a rate at which the user utters syllables specifying a word and/or phrase based on the audio information. Profile component 108 may be configured to determine the rate at which the user utters syllables specifying a word and/or phrase to determine the speech rate and/or other information. Profile component 108 may be configured to determine the rate at which the user utters words and/or phrases based on the audio information. Profile component 108 may be configured to determine the rate at which the user utters words and/or phrases to determine the speech rate and/or other information.

Profile component 108 may be configured to determine the speech rate and/or reading pace from the rate at which the user utters syllables specifying a word and/or phrase based on the audio information. Profile component 108 may be configured to determine the speech rate and/or reading pace from the rate at which the user utters syllables specifying a word and/or phrase to determine the speech rate and/or other information. Profile component 108 may be configured to determine the speech rate and/or reading pace from the rate at which the user utters words and/or phrases based on the audio information. Profile component 108 may be configured to determine the speech rate and/or reading pace from the rate at which the user utters words and/or phrases to determine the speech rate and/or other information.

Profile component 108 may be configured to determine the user information based on the physical communication of the user. Profile component 108 may be configured to determine the speaking profiles of the users based on the physical communication of the user. Profile component 108 may be configured to determine the speaking profiles of the users based on the lip movement of the user conveying a word and/or phrase based on the information defining movement of a body part of the user.

For example, the lip movement of the user may be analyzed to determine the word and/or phrase being conveyed by the user. Profile component 108 may be configured to determine the speaking profiles of the users based the one or more hand gestures, movement, orientation of the fingers, arms or body, and facial expressions may convey ideas and/or the words and/or phrases (e.g., sign language).

Profile component 108 may be configured to determine a rate at which the user moves their lips to specify a word and/or phrase based on the information defining movement of a body part of the user. Profile component 108 may be configured to determine a rate at which the user makes the one or more hand gestures, movement, orientation of the fingers, arms or body, and facial expressions may convey the words and/or phrases.

Profile component 108 may be configured to determine the user's literacy in one or more languages based on the speech rate of the user. Profile component 108 may be configured to determine reading proficiency based on the speech rate of the user and rate of accurate in which the user reads one or more words and/or passages in a story. Profile component 108 may be configured to determine reading proficiency based on the speech rate of the user and rate of accurate in which the user conveys the one or more words and/or phrases in a story. Profile component 108 may be configured to determine the user's enunciation of the words by comparing the user's enunciation of the words and the proper enunciation of the words.

Profile component 108 may be configured to determine an average speaking profile of users corresponding to user identification and/or other information. Profile component 108 may be configured to determine an average speaking profile of users corresponding age, gender, ethnicity, education, and/or other information. Profile component 108 may be configured to obtain speaking profiles of users corresponding age, gender, ethnicity, education, and/or other information. Profile component 108 may be configured to determine the average speaking profile of users based on the speaking profile of users. Profile component 108 may be configured to determine an average speaking profile of users using one or more machine-learning techniques and/or classification techniques. The machine learning techniques may include one or more of a convolution neural network, neural network, decision tree learning, random forest, supervised learning, minimax algorithm, unsupervised learning, semi-supervised learning, reinforcement learning, deep learning, and/or other techniques.

Profile component 108 may be configured to determine the speaking profile of the user based on the user identification. For example, profile component 108 may be configured obtain user identification defining the user's specific age, gender, ethnicity, education, and/or other information, and determine the average speaking profile for the specific age, gender, ethnicity, education, and/or other information of the user. The determined average speaking profile of the user may be the speaking profile of the user. There may be different average speaking profiles for different age, gender, ethnicity, education, and/or other information of the user. In some implementations, profile component 108 may be configured to match the user identification to the average speaking profiles corresponds to the user identification, and determine the speaking profiles based on the matched average speaking profile. In some implementations, profile component 108 may use the combination of user identification and audio information to determine the speaking profiles. In some implementations, profile component 108 may use the combination of user identification and physical communication from the user to determine the speaking profiles.

Identification component 110 may be configured to obtain the audio information and/or other information. Identification component 110 may be configured to obtain the audio information from one or more audio input devices, such as microphones. Identification component 110 may be configured to obtain the audio information from computing platform(s) 140, presentation device(s) 141, and/or other devices. For example, the audio information may be obtained from a microphone of computing platform(s) 140 and/or other devices. Identification component 110 may be configured to obtain the audio information from computing platform(s) 140 and/or other devices. Identification component 110 may be configured to obtain the audio information from devices associated with computing platform(s) 140 and/or other devices. In some implementations, identification component 110 may be configured to obtain information defining the physical communication and/or other information. In some implementations, identification component 110 may be configured to obtain information defining the movement of a body part of the user and/or other information. In some implementations, identification component 110 may be configured to obtain information defining the movement of a body part of the user including movement of the hand, arm, leg, lip, and/or other body parts of the user.

The movement of the body part of the user may convey one or more words and/or phrase. In some implementations, identification component 110 may be configured to obtain information defining the physical communication and/or other information from computing platform(s) 140. For example, identification component 110 may be configured to obtain information defining the physical communication and/or other information generated by image sensors (such as a camera) of computing platform(s) 140. Identification component 110 may be configured to obtain information defining the physical communication and/or other information from visuals of the user captured by the image sensors of computing platform(s) 140. In some implementations, the movement of the lip of the user may convey one or more words and/or phrases and/or other information.

Identification component 110 may be configured to determine a story and/or progress through the story that may be recited and/or conveyed by the user and/or other information. Identification component 110 may be configured to determine the progress through the story that may be recited and/or conveyed by the user while the user recites and/or conveys the story at any point in the story. For example, the user may be reciting and/or conveying the story in a non-linear fashion and identification component 110 may be configured to determine a point in the story the user may be reciting and/or conveying the story. The user may skip portions of the story and identification component 110 may be configured to determine a point in the story where the user began reciting and/or conveying the story. The effects of the story may be presented via presentation device(s) 141 when the story is recited and/or conveyed in the non-linear fashion. Identification component 110 may be configured to determine the story and/or the progress through the story recited and/or conveyed by the user regardless of the story being recited and/or conveyed in a linear and/or the non-linear fashion. Identification component 110 may be configured to determine the story and/or the progress through the story that may be recited by the user based on the audio information, the story information, and/or other information. Identification component 110 may be configured to determine whether the audio information includes one or more words and/or phrases with the word context based on the story information. Identification component 110 may be configured to identify whether the one or more words and/or phrases of the audio information corresponding to the word context of the story information. Identification component 110 may be configured to determine the story and/or point in time within the progress through the story based on the identified words and/or phrases of the audio information corresponding to the word context. The word context corresponding to the identified words and/or phrases may indicate the story and/or point in time within the progress through the story recited by the user.

Identification component 110 may be configured to determine the story and/or progress through the story that may be conveyed (via the physical communication) by the user and/or other information. Identification component 110 may be configured to determine the story and/or progress through the story that may be conveyed based on the physical communication of the user through the movement of the body part of the user. The physical communication of the user may convey one or more words and/or phrases of the story. The physical communication of the user may convey one or more words and/or phrases of the story with word context. Identification component 110 may be configured to determine the story and/or progress through the story that may be conveyed by the user through the movement of the body part of the user. For example, identification component 110 may be configured to determine the story and/or progress through the story that may be conveyed by the user through sign language. Identification component 110 may be configured to determine the story and/or progress through the story that may be conveyed by the user through movement of the lip of the user that conveys the one or more words and/or phrases of the story.

In some implementations, the first story may include one or more of the same words and/or phrases at different points in the first story. The same words and/or phrases may include the same word context. Identification component 110 may be configured to determine which point in the first story the word and/or phrase with word context may be uttered and/or conveyed by the user. For example, the first story may include a first word and/or phrase with a first world context. The first word and/or phrase may occur at a first point in time of the first story, a second point in time of the first story, and/or other points in time of the story. Identification component 110 may be configured to determine which point in the first story the first word and/or phrase may be uttered and/or conveyed by the user.

Identification component 110 may be configured to determine which point in the first story the first word and/or phrase may be uttered and/or conveyed by the user based on the points in time the first word and/or phrase may have been previously uttered and/or conveyed by the user. For example, if the second point in time of the first story occurs after the first point in time, and the first word and/or phrase at the first point in time may have previously been uttered and/or conveyed by the user, identification component 110 may determine that the first word and/or phrase at the second point in time may be uttered and/or conveyed by the user when the user utters and/or conveys the first word and/or phrase. Identification component 110 may determine the progress through the first story that may be uttered and/or conveyed by the user based on the word context, including the first word context.

Identification component 110 may be configured to determine which point in the first story the first word and/or phrase may be uttered and/or conveyed by the user based on the words and/or phrases previously uttered and/or conveyed by the user. Identification component 110 may be configured to determine the point in time the first word and/or phrase may be closest to the last word and/or phrase previously uttered and/or conveyed by the user. Identification component 110 may determine that the point in time the first word and/or phrase may be closest to the last word and/or phrase previously uttered and/or conveyed by the user as the point in time the user uttered and/or conveyed the first word and/or phrase.

Identification component 110 may be configured to determine confidence values for the points in time the first word and/or phrase occurred in the first story. The confidence values may specify a likelihood in which the first word and/or phrase may be uttered and/or conveyed at the individual points in time. The confidence values may include a first confidence value for the first point in time of the first story, a second confidence value for the second point in time of the first story, and/or other confidence values for the other points in time of the first story the first words and/or phrases with the first word context.

In some implementations, the confidence values may be based on the accuracy in which the user uttered and/or conveyed the first word and/or phrase. If a user accuracy enunciates and/or perform movements conveying the first word and/or phrase the confidence values may be greater. In some implementations, the individual confidence values of the first word and/or phrase may be based on the words and/or phrases around the first word and/or phrase at the individual points in time the first word and/or phrase. In some implementations, the confidence values may reflect how accurate and or certain identification component 110 is that the word and/or phrase uttered and/or conveyed by the user may be the first word and/or phrase. In some implementations, the confidence values may reflect how accurate and or certain identification component 110 is that the word and/or phrase uttered and/or conveyed by the user may be the first word and/or phrase at a given point in time in the first story. If the point in time of the first word and/or phrase precedes the last word and/or phrase previously uttered and/or conveyed by the user, the greater the confidence value for the point in time of the first word and/or phrase. If the point in time of the first word and/or phrase precedes the one or more words and/or phrases previously uttered and/or conveyed by the user, the greater the confidence value for the point in time of the first word and/or phrase. If the point in time of the first word and/or phrase naturally follows the one or more words and/or phrases previously uttered and/or conveyed by the user, the greater the confidence value for the point in time of the first word and/or phrase. Identification component 110 may determine and/or update the confidence values while the user utters and/or conveys the one or more words and/or phrases of the first story. Identification component 110 may determine the point in time the user uttered and/or conveyed the first word and/or phrase as the point in time of the first word and/or phrase with the greatest confidence value.

Identification component 110 may be configured to determine the effects that may be presented by presentation device(s) 141 and/or information. Identification component 110 may be configured to determine the effects that may be presented by presentation device(s) 141 based on the content presentation information, the story information, and/or other information. Identification component 110 may identify the story that may be recited and/or conveyed by the user, and determine the effects associated with the story from on the content presentation information. Identification component 110 may identify the story based on through the physical communication of the user, and determine the effects associated with the story from on the content presentation information. Identification component 110 may identify the story based on through the sign language conveying one or more words and/or phrase by the user, and determine the effects associated with the story from on the content presentation information. Identification component 110 may identify the story based on through the movement of the lip of the user conveying the one or more words and/or phrases of the story, and determine the effects associated with the story from on the content presentation information.

Determination component 112 may be configured to determine transmission information and/or other information. The determination component may be configured to determine the transmission information based on the latency information, user information, and/or other information. The transmission information may define transmission points associated with the effects and/or other information. The transmission points may be one or more specific syllables from words and/or phrases in the stories that may occur before the trigger points associated with the effects. The transmission points may specify when information defining instructions (e.g., the control signals) for effectuation presentation of the effects may be transmitted to presentation device(s) 141. The transmission points may specify when information defining instructions for effectuation presentation of the effects may be transmitted to presentation device(s) 141 such that the content may be presented at the trigger points. Determination component 112 may determine the transmission points prior to the user reciting and/or conveying (via the physical communication) the trigger points associated with the transmission points. Determination component 112 may determine the transmission points for the effects when the story being recited and/or conveyed by the user may be identified.

Determination component 112 may determine a first transmission point associated with the first effect and/or other transmission points associated with other effects. The first transmission point may be associated with the first effect, the first trigger point, the first story, and/or other information. The first transmission point may be determined when the first story may be identified and/or before the user recites and/or conveys (via the physical communication) the first trigger point. The first transmission point may be one or more syllables from a word and/or phrase in the first story at which the control signals for the instructions for executing the first effect may be transmitted to presentation device(s) 141 such that presentation device(s) 141 may present the first effect at the first trigger point. The first transmission point may be at a point in time within a progress through the first story before the first trigger point. Determination component 112 may determine the first transmission point prior to the user reciting and/or conveying the first trigger point associated with the first transmission point.

The first transmission point may be determined based on the latency information, user information, and/or other information. In some implementations, a gap between the first transmission point and the first trigger point may be based on the latency information, user information, and/or other information. If the device latency or the speech rate may be high, a greater gap may be between the first transmission point and the first trigger point. If the device latency or the speech rate may be low, a lesser gap may be between the first transmission point and the first trigger point. The gap may be one or more of a word gap, time gap, and/or other gaps.

For example, in some implementations, the number of syllables from words and/or phrases in between the first transmission point and the first trigger point may be based on the latency information, user information, and/or other information. If the device latency or the speech rate may be high, the number of syllables from words and/or phrases in between the first transmission point and the first trigger point may be greater. If the device latency or the speech rate may be low, the number of syllables from words and/or phrases in between the first transmission point and the first trigger point may be fewer.

In some implementations, the number of words and/or phrases in between the first transmission point and the first trigger point may be based on the latency information, user information, and/or other information. If the device latency or the speech rate may be high, the number of words and/or phrases in between the first transmission point and the first trigger point may be greater. If the device latency or the speech rate may be low, the number of words and/or phrases in between the first transmission point and the first trigger point may be fewer.

In some implementations, the number of the movement of the one or more hand gestures, movement, orientation of the fingers, arms or body, and facial expressions that may convey the one or more words and/or phrases in between the first transmission point and the first trigger point may be based on the latency information, user information, and/or other information. If the device latency or the speech rate may be high, the number of the movement conveying the one or more words and/or phrases in between the first transmission point and the first trigger point may be greater. If the device latency or the speech rate may be low, the number of the movement conveying the one or more words and/or phrases in between the first transmission point and the first trigger point may be fewer.

In some implementations, the time in between the first transmission point and the first trigger point may be based on the latency information, user information, and/or other information. If the device latency or the speech rate may be high, the time in between the first transmission point and the first trigger point may be greater. If the device latency or the speech rate may be low, the time in between the first transmission point and the first trigger point may be fewer.

The first transmission point may be chosen such that when the control signals for the instructions for executing the first effect may be transmitted to presentation device(s) 141, the first effect may be executed by the time the user recites and/or conveys the syllables from word and/or phrase of the first trigger point. The first transmission point may be chosen such that when the control signals for the instructions for executing the first effect may be transmitted to presentation device(s) 141, the first effect may be executed by the time the user conveys the word and/or phrase of the first trigger point. The first transmission point may be chosen such that when presentation device(s) 141 receives the control signals for the instructions for executing the first effect and executes the first effect, the user may be reciting the syllables from word and/or phrase of the first trigger point. The first transmission point may be chosen such that when presentation device(s) 141 receives the control signals for the instructions for executing the first effect and executes the first effect, the user may be conveying the word and/or phrase of the first trigger point.

Transmission component 114 may be configured to determine whether the transmission points may have been uttered and/or conveyed (via physical communication) by the user. For example, Transmission component 114 may be configured to determine whether the syllables from word and/or phrase of the first transmission point may have been uttered and/or conveyed by the user. Transmission component 114 may be configured to determine whether the first transmission point may have been uttered and/or conveyed by the user based on the audio information, information defining the physical communication, and/or other information.

Transmission component 114 may be configured to obtain the audio information and/or other information. The audio information may define the utterances from the user that may or may not include the one or more syllables specifying the word and/or phrase of the first transmission point. Transmission component 114 may be configured to determine whether the one or more syllables specifying the words and/or phrases defined by audio information includes the one or more syllables specifying the word and/or phrase of the first transmission point. Transmission component 114 may be configured to compare the one or more syllables specifying the word and/or phrase of the first transmission point with the one or more syllables specifying the words and/or phrases defined by audio information to determine whether the one or more syllables specifying the words and/or phrases defined by audio information includes the one or more syllables specifying the word and/or phrase of the first transmission point. Responsive to determining that the utterances from the user that includes the one or more syllables specifying the word and/or phrase of the first transmission point, transmission component 114 may determine that the first transmission point may have been uttered by the user and/or has occurred.

Transmission component 114 may be configured to obtain the information defining the physical communication and/or other information. The information defining the physical communication may or may not convey the word and/or phrase of the first transmission point. Transmission component 114 may be configured to obtain the information defining the movement of the body part of the user and/or other information. The information defining the movement of the body part of the user that may or may not convey the word and/or phrase of the first transmission point. Transmission component 114 may be configured to determine whether the movement of the body part of the user that conveys the word and/or phrase of the first transmission point. Transmission component 114 may be configured to compare the word and/or phrase of the first transmission point with the word and/or phrase conveyed by the movement of the body part of the user. Responsive to determining that the movement of the body part of the user conveyed the word and/or phrase of the first transmission point, transmission component 114 may determine that the first transmission point may have been conveyed by the user and/or has occurred.

Presentation component 116 may be configured to cause presentation device(s) 141 to effectuate presentation of the effects and/or other information. Presentation component 116 may be configured to cause presentation device(s) 141 to effectuate presentation of the first effect and/or other effects. Presentation component 116 may be configured to cause presentation device(s) 141 to effectuate presentation of the first effect during the oral recitation of the first story. In some implementations, presentation component 116 may be configured to cause presentation device(s) 141 to effectuate presentation of the first effect during the physical communication of the first story. Presentation component 116 may be configured to cause presentation device(s) 141 to effectuate presentation of the first content at the first trigger point. Presentation component 116 may be configured to cause presentation device(s) 141 to effectuate presentation of the first content at the first trigger point such that the first content may be presented by presentation device(s) 141 when the user recites and/or conveys the syllables specifying word and/or phrase of the first trigger point.

Presentation component 116 may be configured to obtain the content presentation information and/or other information. Presentation component 116 may be configured to obtain the content associated with the trigger points of the story. Presentation component 116 may be configured to obtain the content presented at the trigger points of the story. Presentation component 116 may be configured to determine the controls signals for the instructions for presenting the content at the trigger points of the story. Presentation component 116 may be configured to transmit the controls signals for the instructions for presenting the content at the trigger points of the story to the individual presentation device(s) 141 when the user utters and/or conveys the transmission points associated with the effects.

For example, presentation component 116 may be configured to obtain the first content presented at the first trigger points of the first story based on the content presentation information. Presentation component 116 may be configured to determine the controls signals for the instructions for presenting the first content at the first trigger points of the first story. Presentation component 116 may be configured to transmit the controls signals for the instructions for presenting the first content at the first trigger points of the first story to the individual presentation device(s) 141 when the user utters and/or conveys the first transmission points associated with the first effect.

Presentation component 116 may be configured to transmit the control signals for the instructions for effectuating presentation of the first effect such that the first content may be presented at the first trigger point. Presentation component 116 may be configured to transmit the control signals for the instructions for effectuating presentation of the first effect when the first transmission point may have been uttered and/or conveyed by the user. Presentation component 116 may be configured to transmit the control signals for the instructions for effectuating presentation of the first effect when the specific syllables specifying the word and/or phrase of the first transmission point may have been uttered and/or conveyed by the user.

Presentation component 116 may be configured transmit the individual controls signals to individual presentation device(s) 141 contemptuously in time or at different times. Presentation component 116 may be configured to cause the individual presentation device(s) 141 to present the content contemptuously in time or at different times. Presentation component 116 may be configured to cause the individual presentation device(s) 141 to synchronously present the content. Presentation component 116 may be configured to cause the individual presentation device(s) 141 to synchronously present the content at the trigger points during the oral recitation and/or physical communication of the story.

For example, presentation component 116 may be configured to cause the individual presentation device(s) 141 to present the first content contemptuously in time or at different times. Presentation component 116 may be configured to cause the individual presentation device(s) 141 to synchronously present the first content at the first trigger point. Presentation component 116 may be configured to cause the individual presentation device(s) 141 to synchronously present the first content at the first trigger point during the oral recitation and/or physical communication of the first story.

Presentation component 116 may be configured to determine presentation device(s) 141 for presenting the first content and/or other content. Presentation component 116 may be configured to determine whether presentation device(s) 141 may be able and/or enabled to effectuate presentation of the first content. If presentation device(s) 141 may be able and/or enabled to effectuate presentation of the first content, presentation component 116 may be configured to transmit the control signals for the instructions for effectuating presentation of the first content to presentation device(s) 141 such that presentation device(s) 141 may effectuate presentation of the first content at the first trigger point. Presentation component 116 may be configured to determine whether presentation device(s) 141 may be able and/or enabled to effectuate presentation of the first content based on presentation device(s) 141 connected to server(s) 102 and/or computing platform(s) 140.

Byway of non-limiting example, the first content may be audio content and/or visual content. Presentation component 116 may be configured to determine whether presentation device(s) 141 may be able and/or enabled to effectuate presentation of audio content and/or visual content. If presentation device(s) 141 may be able and/or enabled to effectuate presentation of audio content and/or visual content, presentation component 116 may transmit the control signals for the instructions for effectuate presentation of the first content to presentation device(s) 141 such that presentation device(s) 141 may effectuate presentation of the first content at the first trigger point.

Presentation component 116 may be configured to determine when to cease transmission of control signals for the instructions for effectuate presentation of the content by presentation device(s) 141. Presentation component 116 may be configured whether a user stopped reciting and/or conveying the story. Responsive to the user stopped reciting and/or conveying the story, presentation component 116 may be configured to cease transmission of control signals for the instructions for effectuate presentation of the content. Responsive to the user stopped reciting and/or conveying the story, presentation component 116 may be configured to cease recording audio signals from the user. Presentation component 116 may be configured whether a non-reading event occurred. Responsive to a non-reading event occurring presentation component 116 may be configured to cease transmission of control signals for the instructions for effectuate presentation of the content. For example, a non-reading event may include users having a conversation, a doorbell ringing, crying, a phone call, and/or other events not relating to the story.

In some implementations, server(s) 102, computing platform(s) 140, and/or external resource(s) 120 may be operatively linked via one or more electronic communication links. For example, such electronic communication links may be established, at least in part, via a network 103 such as the Internet and/or other networks. It will be appreciated that this is not intended to be limiting, and that the scope of this disclosure may include implementations in which server(s) 102, computing platform(s) 140, and/or external resource(s) 120 may be operatively linked via some other communication media.

In some implementations, external resource(s) 120 may include sources of information, hosts and/or providers of virtual environments outside of system 100, external entities participating with system 100, and/or other resources. In some implementations, some or all of the functionality attributed herein to external resource(s) 120 may be provided by resources included in system 100.

In some implementations, Server(s) 102 may include electronic storage(s) 122, processor(s) 124, and/or other components. Server(s) 102 may include communication lines or ports to enable the exchange of information with a network and/or other computing devices. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing devices operating together as server(s) 102.

In some implementations, electronic storage(s) 122 may include electronic storage media that electronically stores information. The electronic storage media of electronic storage(s) 122 may include one or both of system storage that is provided integrally (i.e., substantially nonremovable) with server(s) 102 and/or removable storage that is removably connectable to server(s) 102 via, for example, a port (e.g., a USB port, a firewire port, etc.) or a drive (e.g., a disk drive, etc.). Electronic storage(s) 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage(s) 122 may include one or more virtual storage resources (e.g., cloud storage, a virtual private network, and/or other virtual storage resources). Electronic storage(s) 122 may store software algorithms, information determined by processor(s) 124, information received from server(s) 102, information received from computing platform(s) 140, and/or other information that enables server(s) 102 to function as described herein.

In some implementations, processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same computing platform, or processor(s) 124 may represent processing functionality of a plurality of devices operating in coordination. The processor(s) 124 may be configured to execute computer-readable instruction components 106, 108, 110, 112, 114, 116, and/or other components. The processor(s) 124 may be configured to execute components 106, 108, 110, 112, 114, 116, and/or other components by software; hardware; firmware; some combination of software, hardware, and/or firmware; and/or other mechanisms for configuring processing capabilities on processor(s) 124.

It should be appreciated that although components 106, 108, 110, 112, 114, and 116 are illustrated in FIG. 1 as being co-located within a single processing unit, in implementations in which processor(s) 124 may include multiple processing units, one or more of components 106, 108, 110, 112, 114, and/or 116 may be located remotely from the other components. The description of the functionality provided by the different components 106, 108, 110, 112, 114, and/or 116 described herein is for illustrative purposes, and is not intended to be limiting, as any of components 106, 108, 110, 112, 114, and/or 116 may provide more or less functionality than is described. For example, one or more of components 106, 108, 110, 112, 114, and/or 116 may be eliminated, and some or all of its functionality may be provided by other ones of components 106, 108, 110, 112, 114, and/or 116. As another example, processor(s) 124 may be configured to execute one or more additional components that may perform some or all of the functionality attributed herein to one of components 106, 108, 110, 112, 114, and/or 116.

Figure 3:
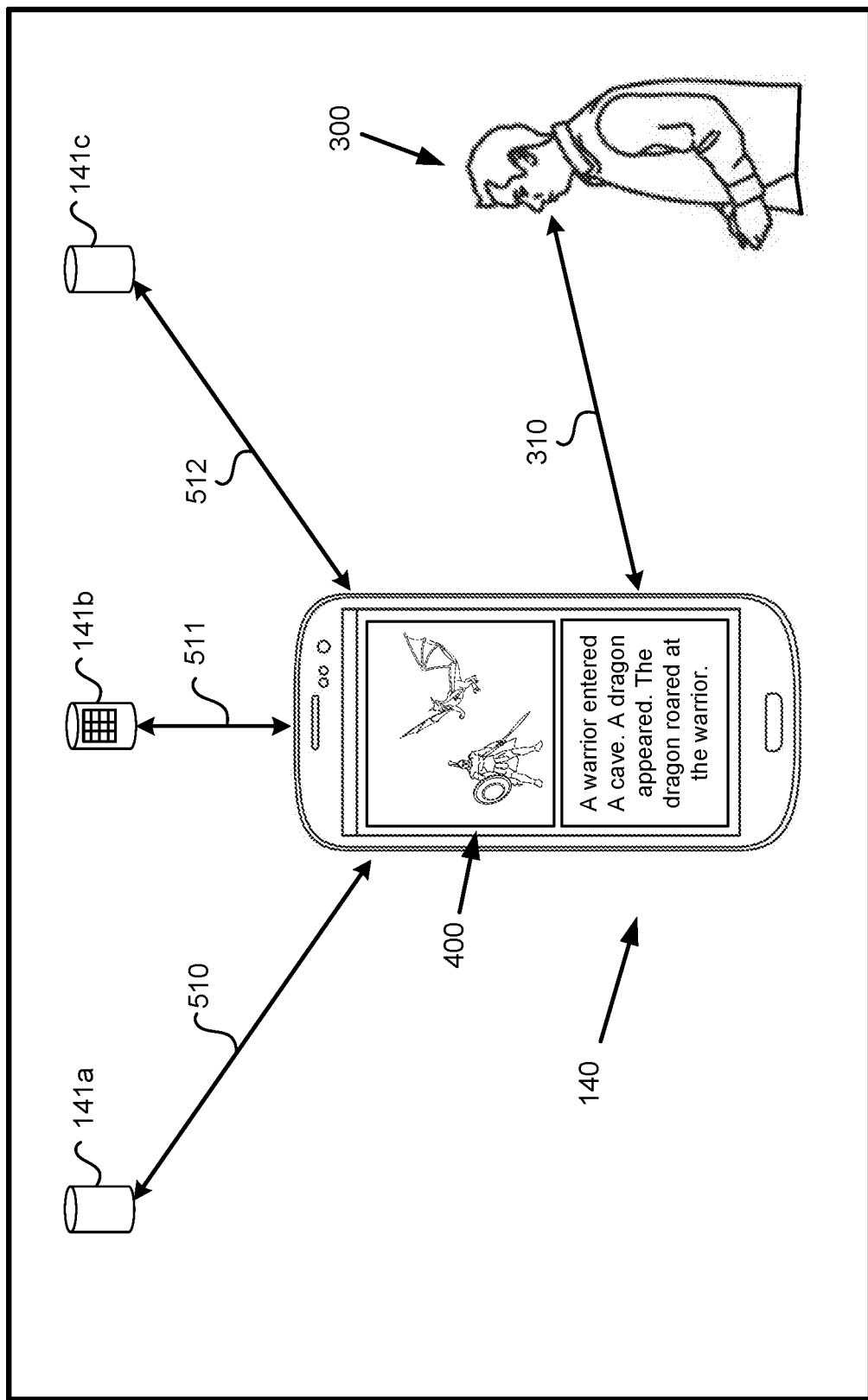
FIG. 3 illustrates a user reciting a story and a computing platform transmitting information to presentation devices based on the user's recitation, in accordance with one or more implementations.

FIG. 3 illustrates a user 300 reciting a story 400. Audio signals 310 of user 300 reciting story 400 may be captured by computing platform(s) 140 and/or other devices. Audio signals 310 of user 300 reciting story 400 may be captured by a microphone of computing platform(s) 140 and/or other devices. Computing platform(s) 140 may transmit control signals defining information for instructions to presentation device(s) 141. The control signals may include a first control signal 510, a second control signal 511, a third control signal 512, and/or other control signals. Presentation device(s) 141 may include a first presentation device 141a, a second presentation device 141b, a third presentation device 141c, and/or other presentation devices. Computing platform(s) 140 may transmit first control signal 510 to first presentation device 141a, second control signal 511 to second presentation device 141b, third control signal 510 to third presentation device 141c, and/or other control signals to other presentation devices.

Figure 4:
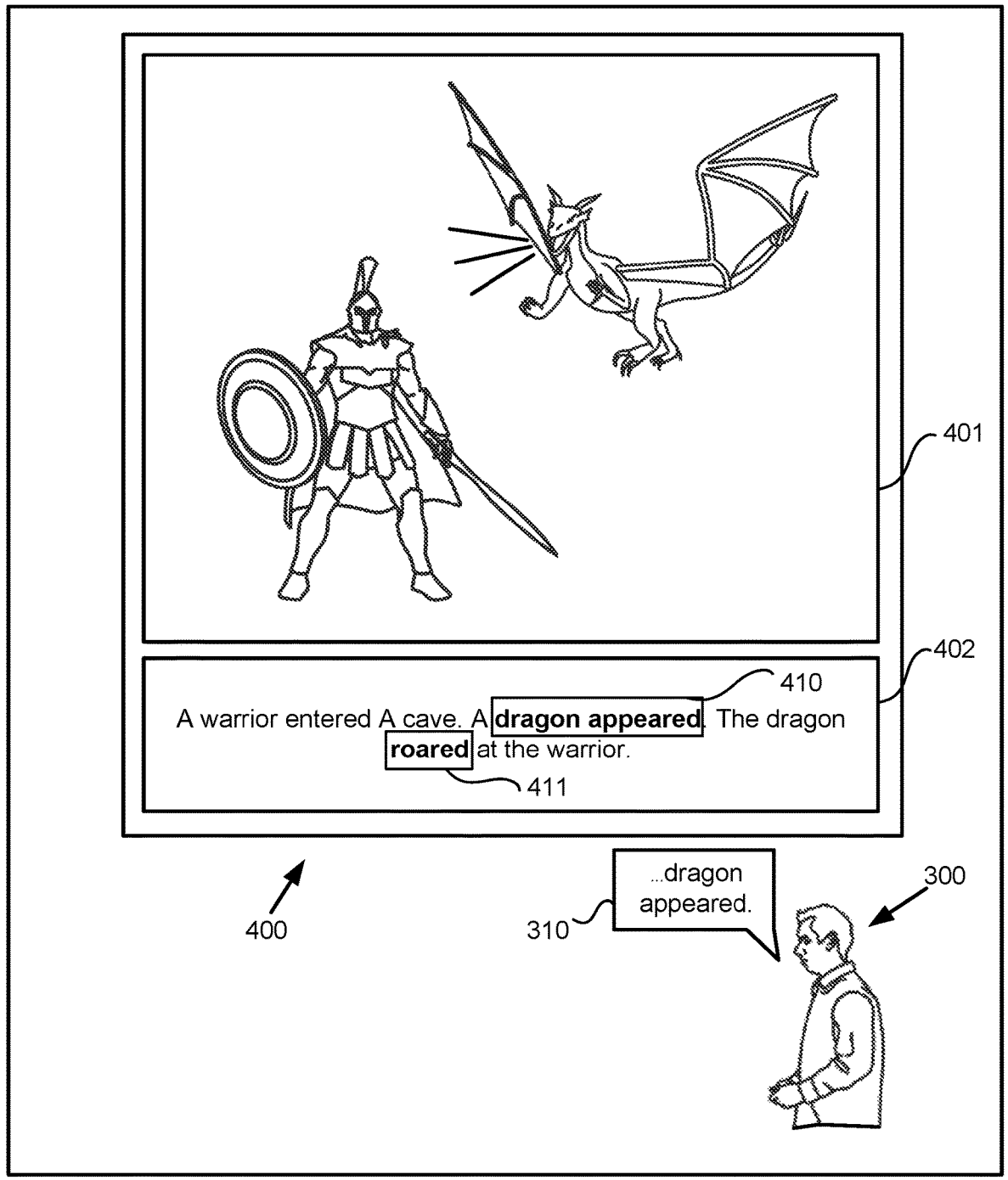
FIG. 4 illustrates the user reciting one or more syllables from a word and/or phrase in the story, in accordance with one or more implementations.

FIG. 4 illustrates user 300 reciting one or more syllables from a word and/or phrase in story 400. Story 400 may include one or more words 402, one or more visuals 401, and/or other content. Story 400 may include a trigger point 411 associated with a content 412 (depicted in FIG. 6), a transmission point 410, and/or other information. Trigger point 411 may be one or more specific syllables from a word and/or phrase in story 400. Transmission point 410 may be one or more specific syllables from a word and/or phrase in story 400. Transmission point 410 may be before trigger point 411. User 300 recitations of one or more syllables from the word and/or phrase in story 400 may include a recitation 310 and/or other information. Recitation 310 may include the one or more specific syllables from the word and/or phrase of transmission point 410.

Figure 5:
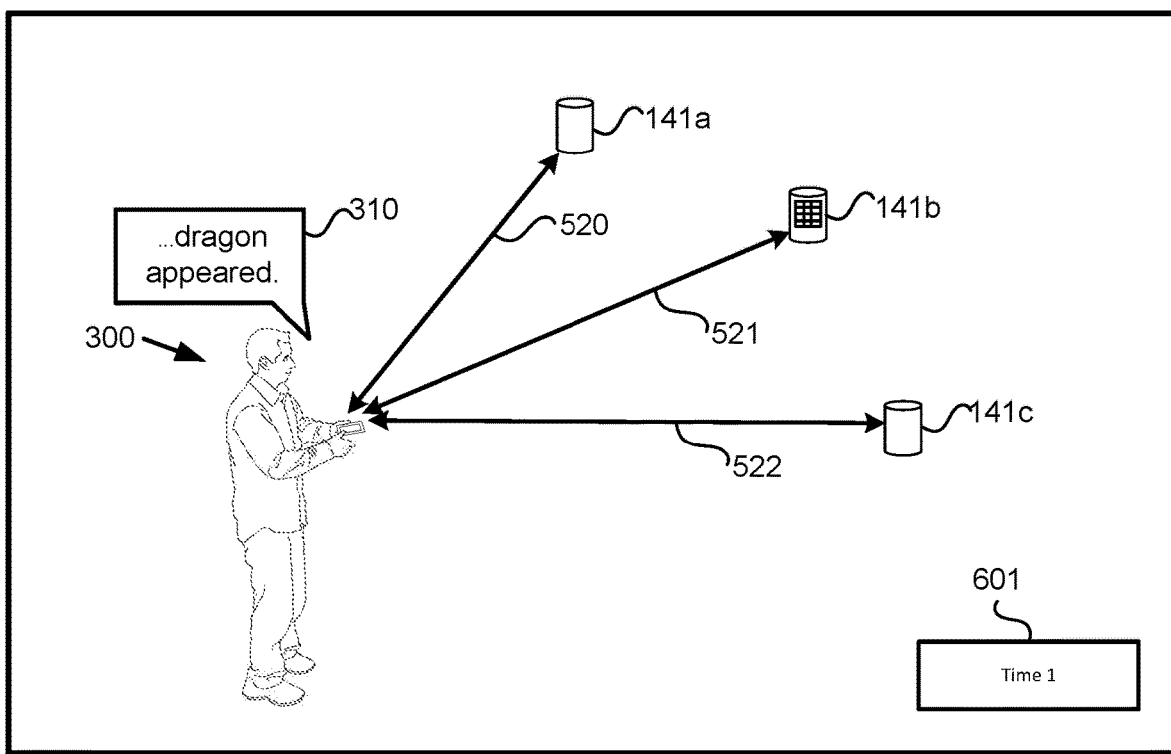
FIG. 5 illustrates the user reciting the one or more syllables from a word and/or phrase in the story and the computing platform transmitting information to presentation devices based on the user's recitation of the one or more syllables from a word and/or phrase in the story, in accordance with one or more implementations.

FIG. 5 illustrates user 300 reciting the one or more syllables from the word and/or phrase in story 400. Responsive to detection of the one or more specific syllables from the word and/or phrase of transmission point 410 being recited by user 300, the control signals may be transmitted to presentation device(s) 141. The control signals may be transmitted to presentation device(s) 141 such that content 412 may be effectuated by presentation device(s) 141 when user 300 recites the one or more specific syllables from the word and/or phrase of trigger point 411. The one or more specific syllables from the word and/or phrase of transmission point 410 may be detected at or around a time 601. The control signals may be transmitted at or around time 601.

Figure 6:
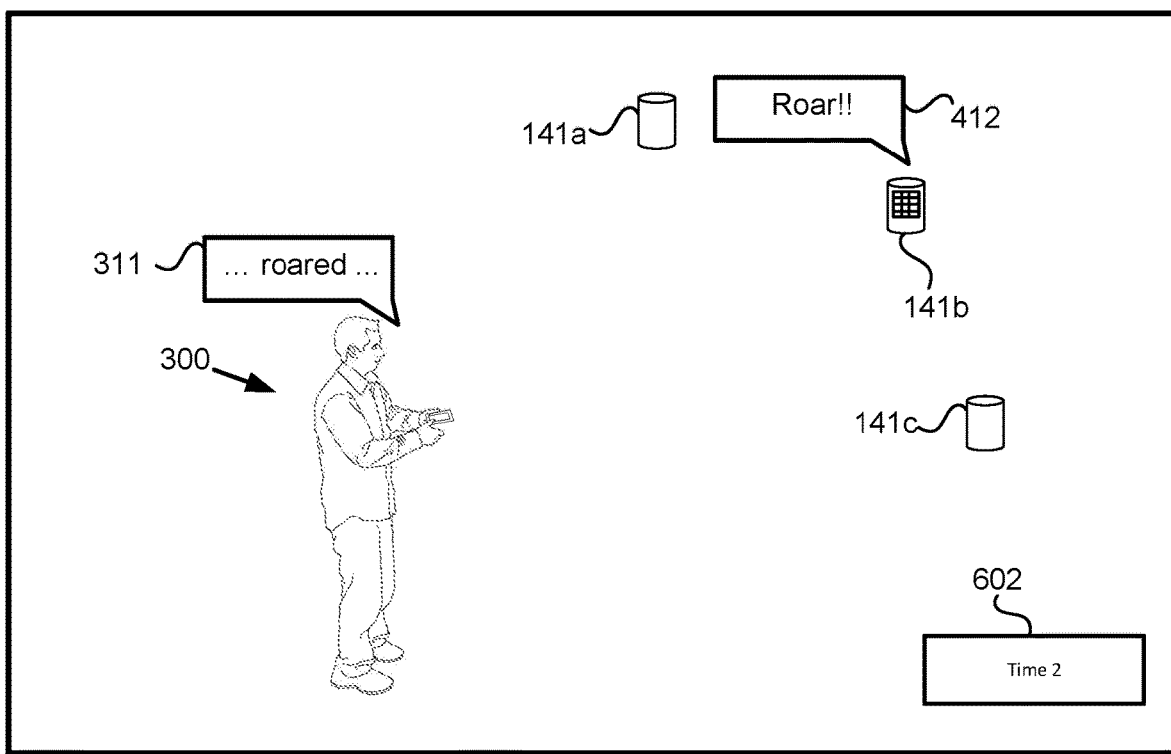
FIG. 6 illustrates a presentation device effectuating presentation of content based on the information transmitted to the presentation devices, in accordance with one or more implementations.

FIG. 6 illustrates user 300 reciting the one or more syllables from the word and/or phrase in story 400. The control signals may be transmitted to presentation device(s) 141 such that content 412 may be effectuated by presentation device(s) 141 when user 300 recites the one or more specific syllables from the word and/or phrase of trigger point 411. Recitation 311 may include the one or more specific syllables from the word and/or phrase of trigger point 411. When user 300 recites recitation 311 including the word and/or phrase of trigger point 411, presentation device(s) 141 (such as second presentation device 141b) may effectuate presentation of content 412. User 300 may recite recitation 311 including the word and/or phrase of trigger point 411 at a time 602. Presentation device(s) 141 (such as second presentation device 141b) may effectuate presentation of content 412 at time 602. Content 412 may correspond with a context of the word and/or phrase of trigger point 411. Although FIG. 6 illustrates presentation of audio content (e.g., content 412), content 412 may be other content. For example, content 412 may be flashing one or more lights of second presentation device 141b, adjusting a temperature of a room, and/or other content.

Figure 7:
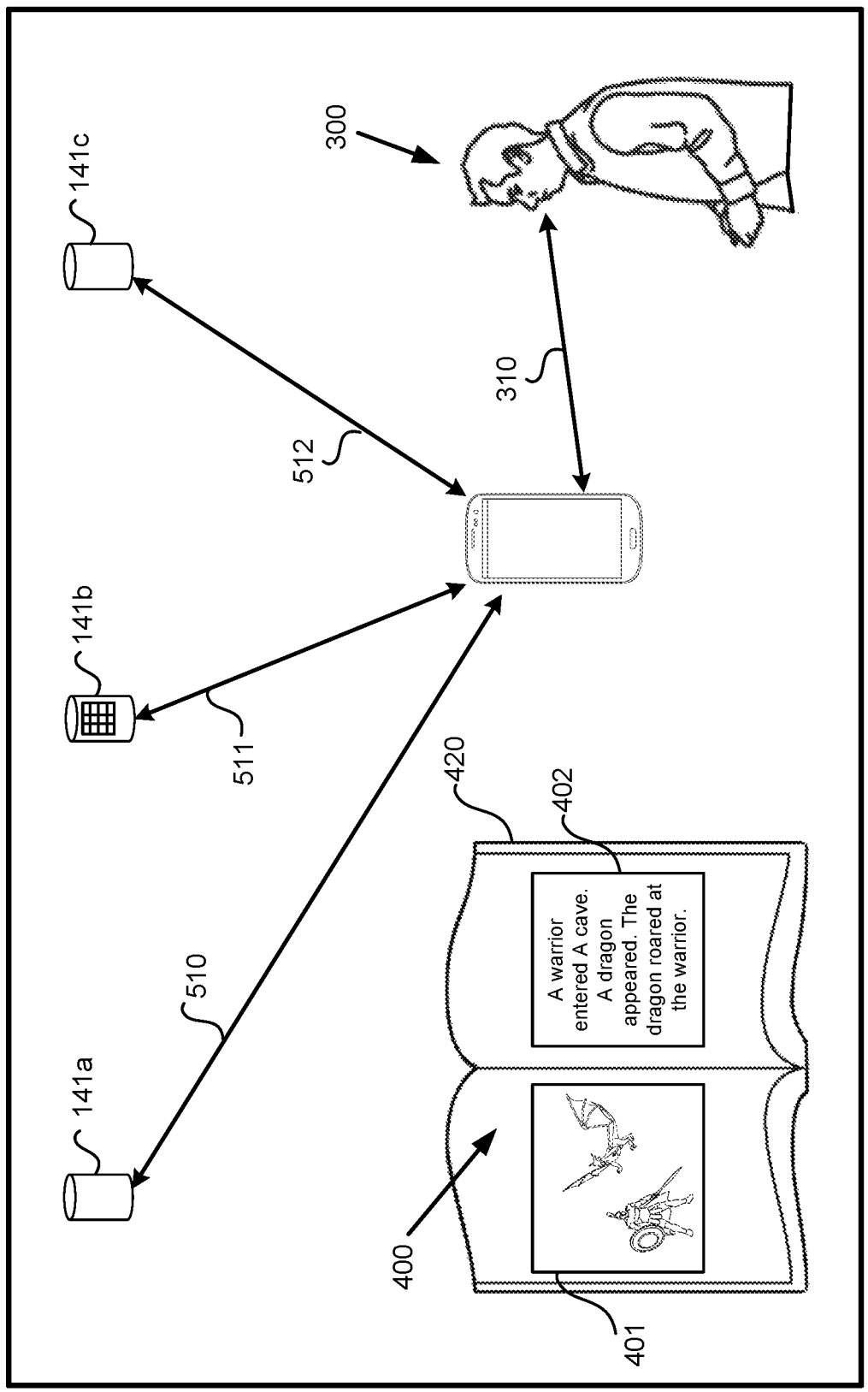
FIG. 7 illustrates the user reciting the story on a physical book, and the computing platform transmitting information to presentation devices based on the user's recitation, in accordance with one or more implementations.

FIG. 7 illustrates user 300 reciting one or more syllables from the word and/or phrase in story 400 on a physical book 420. Story 400 on physical book 420 may include one or more words 402, one or more visuals 401, and/or other content. The one or more words 402, one or more visuals 401 may be physically printed on physical book 420. User 300 recitations of one or more syllables from the word and/or phrase in story 400 may include recitation 310 and/or other information. Recitation 310 may include the one or more specific syllables from the word and/or phrase of transmission point 410. Computing platform(s) 140 may be configured to capture audio signals of user 300 reciting the one or more syllables from a word and/or phrase in story 400. Computing platform(s) 140 may be configured to capture audio signals of recitation 310.

Figure 8:
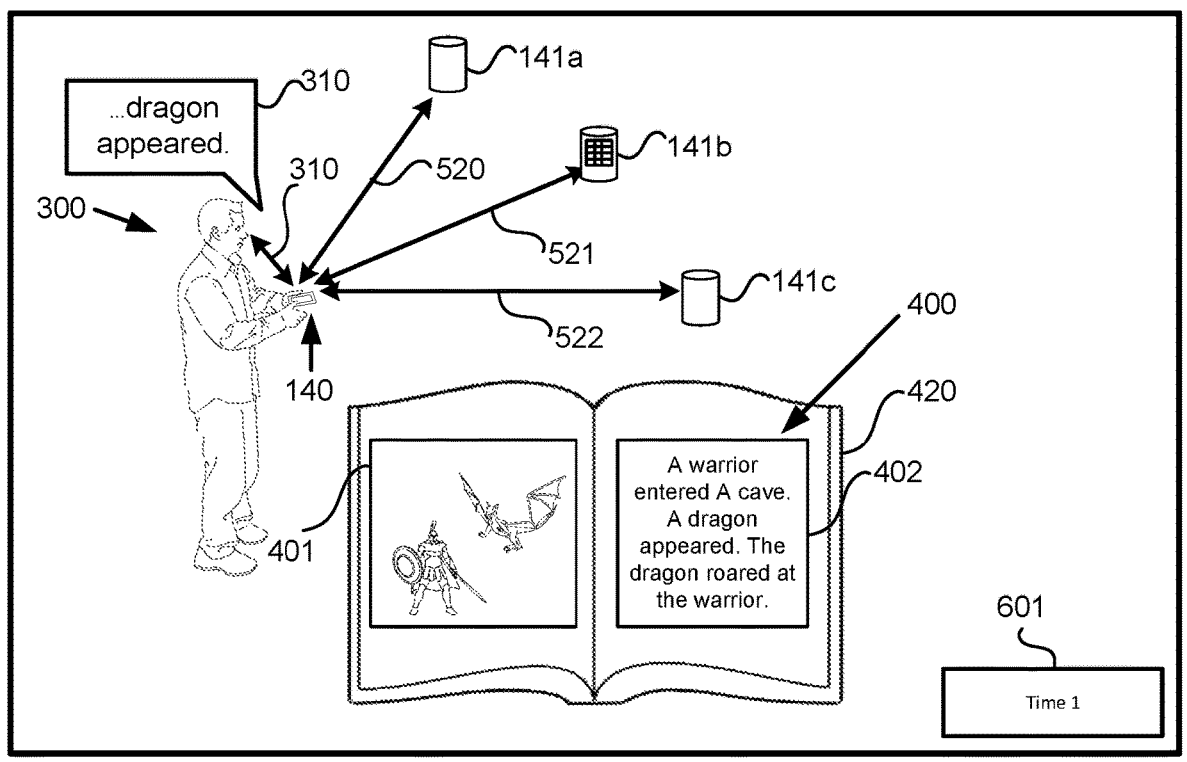
FIG. 8 illustrates the user reciting the one or more syllables from a word and/or phrase in the story on the physical book and the computing platform transmitting information to presentation devices based on the user's recitation of the one or more syllables from a word and/or phrase in the story, in accordance with one or more implementations.

FIG. 8 illustrates user 300 reciting the one or more syllables from the word and/or phrase in story 400 on physical book 420. Responsive to detection of the one or more specific syllables from the word and/or phrase of transmission point 410 being recited by user 300, the control signals may be transmitted to presentation device(s) 141. The word and/or phrase of transmission point 410 being recited by user 300 may be included in recitation 310. The control signals may be transmitted to presentation device(s) 141 by computing platform(s) 140. The control signals may be transmitted to presentation device(s) 141 when the word and/or phrase of transmission point 410 may be recited by user 300. The control signals may be transmitted to presentation device(s) 141 such that content 412 may be effectuated by presentation device(s) 141 when user 300 recites the one or more specific syllables from the word and/or phrase of trigger point 411. The one or more specific syllables from the word and/or phrase of transmission point 410 may be detected at or around time 601. The control signals may be transmitted at or around time 601.

Figure 9:
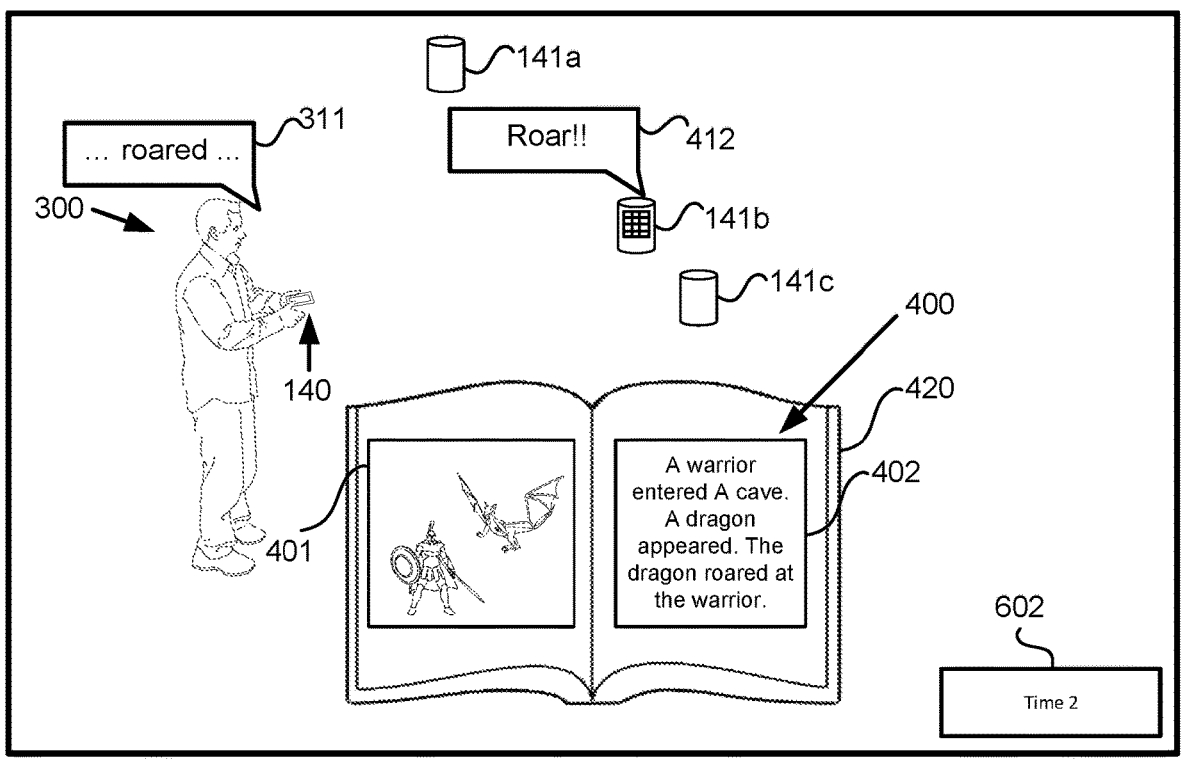
FIG. 9 illustrates the presentation device effectuating presentation of content based on the information transmitted to the presentation devices, in accordance with one or more implementations.

FIG. 9 illustrates user 300 reciting the one or more syllables from the word and/or phrase in story 400 on physical book 420. The control signals may be transmitted to presentation device(s) 141 such that content 412 may be effectuated by presentation device(s) 141 when user 300 recites the one or more specific syllables from the word and/or phrase of trigger point 411. Recitation 311 may include the one or more specific syllables from the word and/or phrase of trigger point 411. When user 300 recites recitation 311 including the word and/or phrase of trigger point 411, presentation device(s) 141 (such as second presentation device 141b) may effectuate presentation of content 412. User 300 may recite recitation 311 including the word and/or phrase of trigger point 411 at time 602. Presentation device(s) 141 (such as second presentation device 141b) may effectuate presentation of content 412 at time 602. Content 412 may correspond with a context of the word and/or phrase of trigger point 411.

Figure 10:
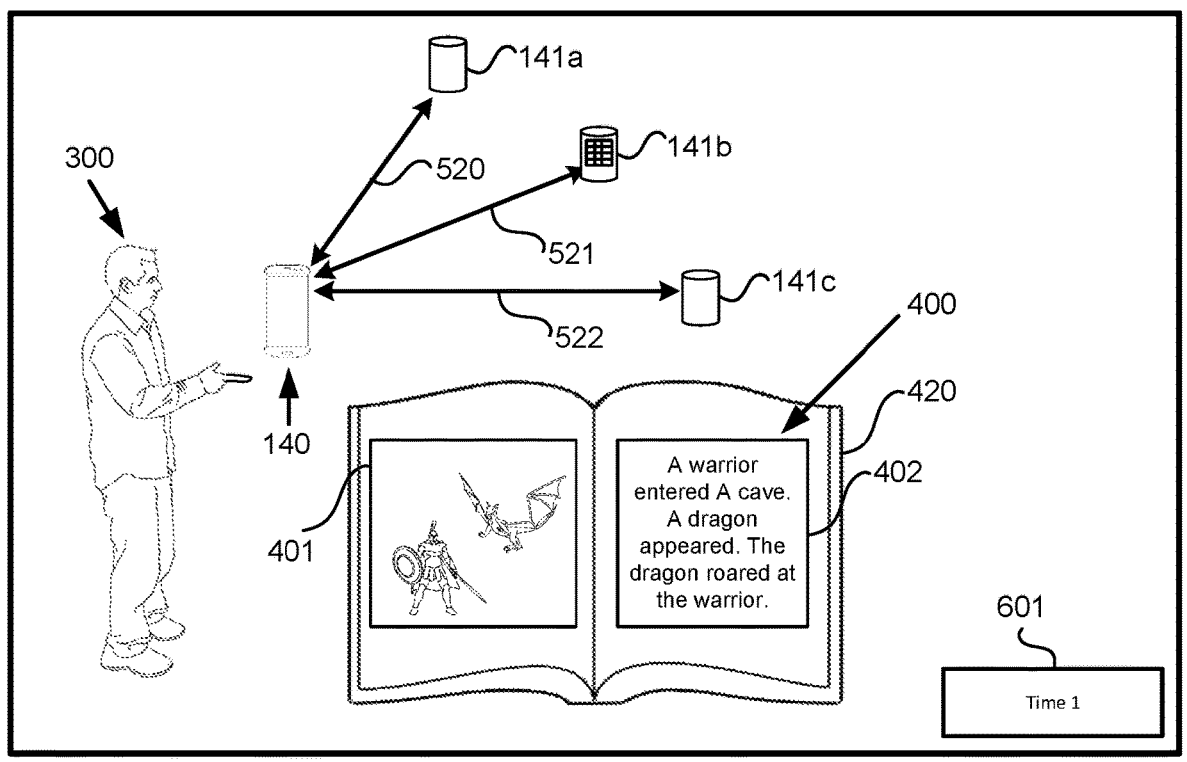
FIG. 10 illustrates the user conveying the word and/or phrase in the story on the physical book via sign language and the computing platform transmitting information to presentation devices based on the word and/or phrase conveyed by the user, in accordance with one or more implementations.

FIG. 10 illustrates user 300 conveying the word and/or phrase in story 400 on physical book 420 via sign language and/or movement of a body part. For example, the movement of the body part may be movement of an arm and/or finger. Computing platform(s) 140 may obtain visuals of user 300 conveying the word and/or phrase in story 400 via sign language and/or movement of a body part. The control signals may be transmitted to presentation device(s) 141 such that content 412 may be effectuated by presentation device(s) 141 when user 300 conveys the word and/or phrase of trigger point 411. The control signals may be transmitted to presentation device(s) 141 when user 300 conveys the word and/or phrase of transmission point 410. The word and/or phrase of transmission point 410 conveyed by user 300 may be detected at or around time 601. The control signals may be transmitted to presentation device(s) 141 at or around time 601.

Figure 11:
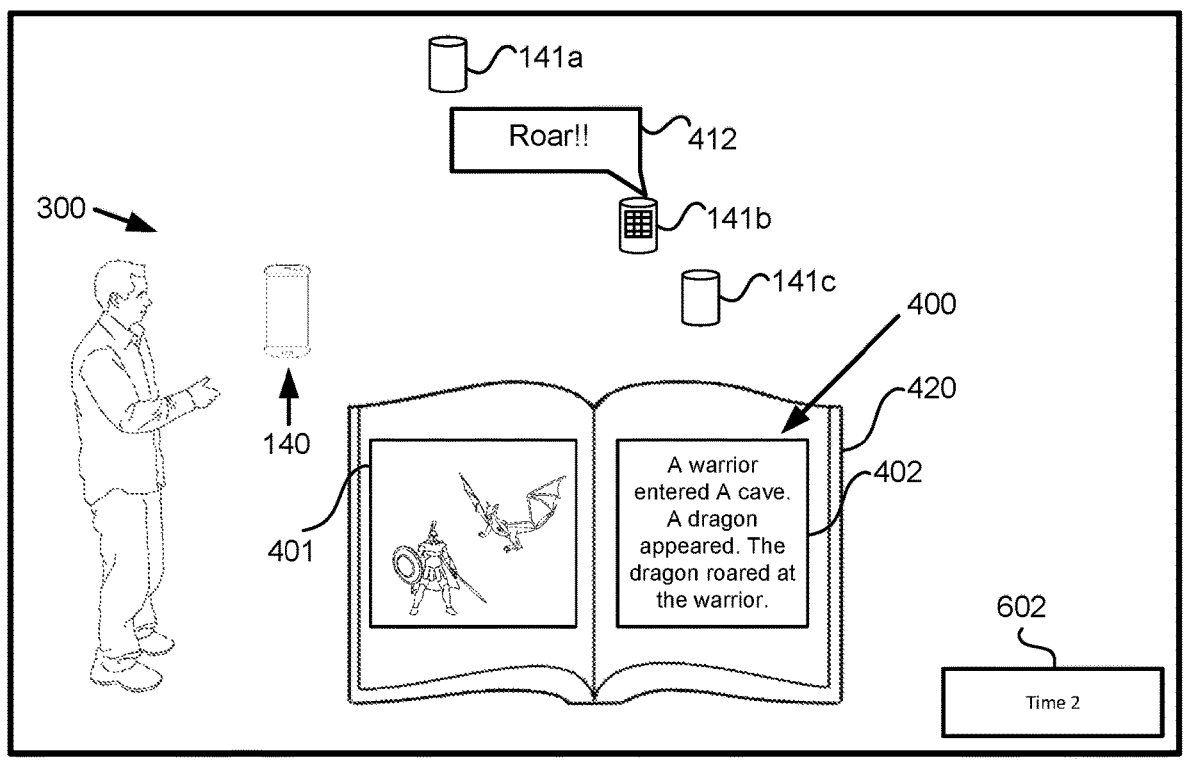
FIG. 11 illustrates the presentation device effectuating presentation of content based on the information transmitted to the presentation devices, in accordance with one or more implementations.

FIG. 11 illustrates user 300 conveying the word and/or phrase in story 400 on physical book 420 via sign language and/or movement of a body part. The control signals may be transmitted to presentation device(s) 141 such that content 412 may be effectuated by presentation device(s) 141 when user 300 conveys the word and/or phrase of trigger point 411. The control signals may be transmitted to presentation device(s) 141 when user conveys the word and/or phrase of transmission point 410. When user 300 conveys the word and/or phrase of trigger point 411, presentation device(s) 141 (such as second presentation device 141b) may effectuate presentation of content 412. User 300 may convey the word and/or phrase of trigger point 411 at time 602. Presentation device(s) 141 (such as second presentation device 141b) may effectuate presentation of content 412 at time 602. Content 412 may correspond with a context of the word and/or phrase of trigger point 411.

Figure 2:
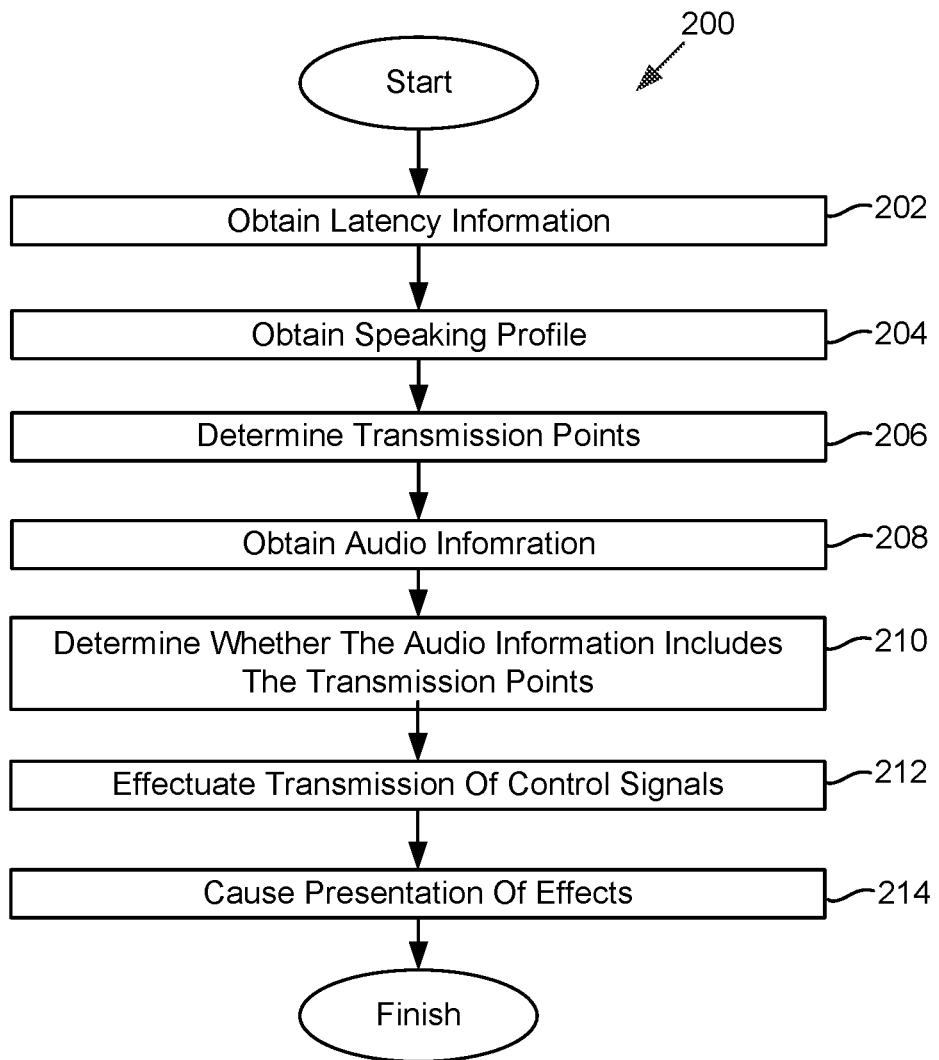
FIG. 2 illustrates a method for facilitating a presentation of story-related effects at points in a story, in accordance with one or more implementations.

FIG. 2 illustrates the method 200, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below are not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, latency information may be obtained. The latency information may convey device latency in the execution of the effects by the individual presentation devices. The device latency may be a time delay between the transmission of a control signal instructing the individual presentation devices to present the effects and when the individual presentation devices present the effects. The effects may be presented by one or more presentation devices during oral recitation of one or more stories. The individual effects may correspond to individual ones of the one or more stories. The effects may be associated with trigger points and content. A first effect corresponds to a first story from the one or more stories may be associated with a first trigger point and first content. The first trigger point may be one or more specific syllables from a word and/or phrase in the first story at which the first content should be presented. The first content may include one or more of audio content, visual content, and/or motion content. In some embodiments, operation 202 is performed by a latency component the same as or similar to latency component 106 (shown in FIG. 1 and described herein).

At an operation 204, a speaking profile of a user may be obtained. The speaking profile may define a speech rate of the user. The speech rate may indicate a rate at which the user utters words included in the stories. In some embodiments, operation 204 is performed by a profile component the same as or similar to profile component 108 (shown in FIG. 1 and described herein).

At an operation 206, individual transmission points may be determined. The individual transmission points may be associated with the individual effects corresponding to the individual ones of the one or more stories. The individual transmission points may be determined based on the latency information and the speaking profile. A first transmission point associated with the first effect may be determined. The first transmission point may be one or more syllables from a word and/or phrase in the first story. The first transmission point may be one or more syllables from a word and/or phrase in the first story at which the control signals for executing the first effect may be transmitted to the individual presentation devices. The control signals for executing the first effect may be transmitted to the individual presentation devices such that the individual presentation devices present the first effect at the first trigger point. The first transmission point may be at a point in time within a progress through the first story before the first trigger point. In some embodiments, operation 206 is performed by a determination component the same as or similar to determination component 112 (shown in FIG. 1 and described herein).

At an operation 208, audio information may be obtained. The audio information may define utterances by the user. The utterances may include the one or more syllables specifying a word and/or phrase. In some embodiments, operation 208 is performed by a transmission component the same as or similar to transmission component 114 (shown in FIG. 1 and described herein).

At an operation 210, whether the utterances by the user include the one or more syllables from the word and/or phrase in the first story of the first transmission point may be determined. In some embodiments, operation 210 is performed by the transmission component the same as or similar to transmission component 114 (shown in FIG. 1 and described herein).

At an operation 212, control signals may be transmitted. The control signals may include instructions for executing the first effect to the individual presentation devices such that the individual presentation devices present the first effect at the first trigger point may be transmitted. The control signals may be transmitted responsive to the utterances by the user include the one or more syllables from the word and/or phrase in the first story of the first transmission point. In some embodiments, operation 212 is performed by the transmission component the same as or similar transmission component 114 (shown in FIG. 1 and described herein).

At an operation 214, the individual presentation devices may be caused to effectuate presentation of the first effect at the first trigger point. In some embodiments, operation 214 is performed by a presentation component the same as or similar to presentation component 116 (shown in FIG. 1 and described herein).

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed:

1. A system configured to facilitate presentation of story-related effects, the system comprising:
   non-transitory electronic storage storing content presentation information for effects that are presented by one or more presentation devices during oral recitation of one or more stories, individual effects corresponding to individual stories and being associated with trigger points comprising one or more specific syllables from a word or phrase in the individual stories;
   one or more physical processors configured by machine-readable instructions to:
      determine individual transmission points associated with the individual effects based on latency information and a speaking profile of a user, the latency information conveying device latency in execution of the effects by individual presentation devices upon transmission of control signals to the individual presentation devices, the speaking profile defining a speech rate of the user, wherein the individual transmission points include one or more syllables from an other word or phrase in the individual stories at which the control signals for executing the individual effects are transmitted to the individual presentation devices so that the individual presentation devices present the individual effects at the trigger points;
      determine whether utterances by the user include the one or more syllables from the other word or phrase in the individual stories associated with the individual transmission points; and
      responsive to the utterances by the user including the one or more syllables from the other word or phrase in the individual stories associated with the individual transmission points, effectuate transmission of the control signals for executing the individual effects so that the individual presentation devices present the individual effects at individual trigger points.

2. The system of claim 1, wherein the individual effects include one or more of audio content, visual content, motion content, or environmental content, wherein the audio content includes one or more of a soundtrack, music, sound effects, or utterances, the visual content includes one or more of images, video, or manipulating a lighting device of the individual presentation devices, the motion content includes a haptic feedback and/or movement, and the environmental content includes a change in environmental condition.

3. The system of claim 1, wherein a story includes words and/or phrases with word context, the word context indicating a point in time within the progress through the story.

4. The system of claim 3, wherein the story is determined as currently being read by the user based on the word context.

5. The system of claim 1, wherein the device latency and the speaking profile are monitored while the user is reciting a story.

6. The system of claim 1, wherein the speaking profile corresponds to one or more of a reading proficiency, a reading pace and pacing, an enunciation of words, or an age of the user.

7. The system of claim 1, wherein the one or more physical processors are further configured by the machine-readable instructions to cease transmission of individual control signals when a non-reading event is detected.

8. The system of claim 1, wherein sets of control signals are transmitted contemptuously in time or at different times.

9. The system of claim 1, wherein:
   when the device latency or the speech rate is high, the individual transmission points occur earlier in the individual stories and before the individual trigger points; and
   when the device latency or the speech rate is low, the individual transmission points occur later in the individual stories and before the individual trigger points.

10. The system of claim 1, wherein the individual transmission points are determined when the individual stories are identified and before the user recites the individual trigger points.

11. A method to facilitate presentation of story-related effects, the method comprising:
   storing content presentation information for effects that are presented by one or more presentation devices during oral recitation of one or more stories, individual effects corresponding to individual stories and being associated with trigger points comprising one or more specific syllables from a word or phrase in the individual stories;

determining individual transmission points associated with the individual effects based on latency information and a speaking profile of a user, the latency information conveying device latency in execution of the effects by individual presentation devices upon transmission of control signals to the individual presentation devices, the speaking profile defining a speech rate of the user, wherein the individual transmission points include one or more syllables from an other word or phrase in the individual stories at which the control signals for executing the individual effects are transmitted to the individual presentation devices so that the individual presentation devices present the individual effects at the trigger points;

determining whether utterances by the user include the one or more syllables from the other word or phrase in the individual stories associated with the individual transmission points; and responsive to the utterances by the user including the one or more syllables from the other word or phrase in the individual stories associated with the individual transmission points, effectuating transmission of the control signals for executing the individual effects so that the individual presentation devices present the individual effects at individual trigger points.

12. The method of claim 11, wherein the individual effects include one or more of audio content, visual content, motion content, or environmental content, wherein the audio content includes one or more of a soundtrack, music, sound effects, or utterances, the visual content includes one or more of images, video, or manipulating a lighting device of the individual presentation devices, the motion content includes a haptic feedback and/or movement, and the environmental content includes a change in environmental condition.

13. The method of claim 11, wherein a story includes words and/or phrases with word context, the word context indicating a point in time within the progress through the story.

14. The method of claim 13, wherein the story is determined as currently being read by the user based on the word context.

15. The method of claim 11, wherein the device latency and the speaking profile are monitored while the user is reciting a story.

16. The method of claim 11, wherein the speaking profile corresponds to one or more of a reading proficiency, a reading pace and pacing, an enunciation of words, or an age of the user.

17. The method of claim 11, further comprising ceasing transmission of individual control signals when a non-reading event is detected.

18. The method of claim 11, wherein sets of control signals are transmitted contemptuously in time or at different times.

19. The method of claim 11, wherein:
when the device latency or the speech rate is high, the individual transmission points occur earlier in the individual stories and before the individual trigger points; and
when the device latency or the speech rate is low, the individual transmission points occur later in the individual stories and before the individual trigger points.

20. The method of claim 11, wherein the individual transmission points are determined when the individual stories are identified and before the user recites the individual trigger points.

* * * * *